(12) United States Patent
Wang

(10) Patent No.: US 12,439,495 B2
(45) Date of Patent: Oct. 7, 2025

(54) POWER LINE COMMUNICATION TO CONTROL LIGHTING

(71) Applicant: Focus Universal Inc., Ontario, CA (US)

(72) Inventor: Desheng Wang, Diamond Bar, CA (US)

(73) Assignee: Focus Universal, Inc., Ontario, CA (US)

( * ) Notice: Subject to any disclaimer, the term of this patent is extended or adjusted under 35 U.S.C. 154(b) by 189 days.

(21) Appl. No.: 18/211,462

(22) Filed: Jun. 19, 2023

(65) Prior Publication Data

US 2024/0155755 A1 May 9, 2024

Related U.S. Application Data

(63) Continuation of application No. 17/749,132, filed on May 19, 2022, now Pat. No. 11,683,875.

(60) Provisional application No. 63/190,445, filed on May 19, 2021.

(51) Int. Cl.
*H05B 47/185* (2020.01)
*H05B 47/105* (2020.01)

(52) U.S. Cl.
CPC ......... *H05B 47/185* (2020.01); *H05B 47/105* (2020.01)

(58) Field of Classification Search
CPC .................................... H05B 47/185
USPC ............................................ 375/257
See application file for complete search history.

(56) References Cited

U.S. PATENT DOCUMENTS

| | | | | |
|---|---|---|---|---|
| 2001/0034223 | A1* | 10/2001 | Rieser | H04W 76/50 455/404.2 |
| 2004/0120413 | A1* | 6/2004 | Park | H04L 27/2607 375/260 |
| 2018/0070424 | A1* | 3/2018 | Lark, Jr. | H05B 47/11 |
| 2019/0297705 | A1* | 9/2019 | Bovino | H05B 47/18 |
| 2019/0354222 | A1* | 11/2019 | Frescas | G06F 3/016 |
| 2020/0004119 | A1* | 1/2020 | Yamaya | G03B 21/2013 |
| 2020/0088813 | A1* | 3/2020 | Gerginov | G01R 33/26 |

* cited by examiner

*Primary Examiner* — Lihong Yu
(74) *Attorney, Agent, or Firm* — Chang & Hale LLP

(57) ABSTRACT

Disclosed herein are systems and methods using power line communication to control light fixtures. The system operates in two phases. In the first phase, a control device generates commands which are encoded on a control signal. The control signal is generated by encoding data using two sinusoidal waves, the second sinusoidal wave being a phase-shifted copy of the first sinusoidal wave. The resulting control signal is sent on a power line. The control signal is received by light fixtures and/or sensors through an ultra-narrow band filter, decoded and converted to executable instructions for the light fixtures and data parameters for sensors. In the second phase, the light fixtures are jointly controlled by the control device and the sensors. The control in phase two is hybrid open loop/closed loop control.

16 Claims, 9 Drawing Sheets

POWER LINE COMMUNICATION TO CONTROL LIGHTING

CROSS-REFERENCE TO RELATED APPLICATIONS

This application is a continuation of U.S. application Ser. No. 17/749,132 filed May 19, 2022 and entitled "POWER LINE COMMUNICATION TO CONTROL LIGHTING," which claims priority to U.S. Prov. App. No. 63/190,445 filed May 19, 2021 and entitled "SYSTEM AND METHOD FOR POWER LINE COMMUNICATION TO CONTROL LIGHTING," each of which is expressly incorporated by reference herein in its entirety for all purposes.

BACKGROUND

Field

The present disclosure generally relates to using power line communication to control lighting.

Description of Related Art

Residential and commercial lighting can be controlled by lighting control devices. One or more lighting fixtures can be electrically and communicably coupled to a lighting control device. The lighting control device can send control commands to control operation of the one or more lighting fixtures. The lighting fixtures can be grouped into zones or sets to jointly control a plurality of lighting fixtures in the corresponding zone. The lighting fixtures in a zone can be electrically coupled together and coupled to the lighting control device via a port in a controller. Thus, the controller can send a command signal through a port to control all the lighting fixtures in the corresponding zone. Sometimes, a temperature sensor can be associated with a zone and control of the lighting fixtures in the zone can be based at least in part on the measurements of the associated temperature sensor.

SUMMARY

In some aspects, the techniques described herein relate to a system for controlling devices via power line communication, including: a control device which sends commands which may be converted to binary communication; a first transceiver electrically connected to the control device, the emitter including: a crystal oscillator, the crystal oscillator being powered to transmit a sinusoidal wave at a transmission frequency; a signal splitter electrically connected to the crystal oscillator which creates a copy of the sinusoidal wave, the signal splitter including a splitter output and a second splitter output; a phase shift circuit electrically connected to the second splitter output, the phase shift circuit phase shifting the copy of the sinusoidal wave, and outputting the phase shifted copy of the sinusoidal wave to a phase shift circuit output; a switch including a first terminal, a second terminal, and a switch output, the switch electrically connected on the first terminal to the first splitter output and on the second terminal to the phase shift circuit output, the switch operating at a cycle of at least twice the frequency of the crystal oscillator to switch between connecting the first terminal to the switch output or the second terminal to the switch output according to a baseband signal, in order to create a control signal; a first processor electrically connected to the switch, the first processor creating a baseband signal based on the commands in order to operate the switch; and a first memory electrically connected to the processor, the first memory storing a protocol for converting the commands to binary data; a power line electrically connected to the switch output, the power line carrying an electrical power signal and the control signal; one or more components electrically connected to the power line, the one or more components including: a second transceiver including a coupling circuit including a transformer and at least one filtering circuit which performs bandpass filtering, an ultra-narrow band filter which bandpass filters a bandwidth centered around the transmission frequency, a second memory containing a copy of the protocol, and a second processor electrically connected to the second memory and the ultra-narrow band filter, the second processor executing the protocol to baseband decode the control signal, wherein, the at least one filtering circuit increases the total filtering of the second transceiver by an order of magnitude.

In some aspects, the techniques described herein relate to a system, wherein the components include at least one lighting fixture and at least one sensor.

In some aspects, the techniques described herein relate to a system, wherein the system includes at least one lighting fixture and at least one temperature sensor, the temperature sensor being integrated with the at least one lighting fixture.

In some aspects, the techniques described herein relate to a system, further including at least one temperature sensor electrically connected to the one or more light fixtures, the at least one temperature sensor including a third transceiver, the third transceiver including a third processor and a third memory electrically connected to the third processor.

In some aspects, the techniques described herein relate to a system, wherein the temperature sensor sends commands to at least one of the one or more light fixtures based on parameters stored in the third memory.

In some aspects, the techniques described herein relate to a system, further including a humidity sensor electrically connected to the light fixture.

In some aspects, the techniques described herein relate to a system, wherein each of the one or more light fixtures is electrically connected to a quantum sensor.

In some aspects, the techniques described herein relate to a method for providing power line communication in a lighting system, including: executing a first phase, including: generating a sinusoidal wave using a crystal oscillator; splitting the sinusoidal wave in to a first signal and a second signal; phase shifting the second signal; forming at least one first phase control signal by operating a switch which outputs either the first signal or second signal according to a baseband signal, the first signal and second signal each being indicative of a binary state, the output first signal or second signal according to a baseband signal creating a first phase control signal; outputting the at least one first phase control signal to a power line; receiving the first phase control signal on a transceiver including a filter electrically connected to the power line, the filter including a filter in a coupling circuit and an ultra-narrow band filter, the ultra-narrow band filter electrically connected to a processor, the processor being connected to a memory; converting the control signal to executable instructions using a protocol stored on the memory; and controlling the operation of at least one component, and setting one or more parameters for at least one sensor based on the converted control signal; executing a second phase, including: monitoring a predetermined type of data with the at least one sensor; and checking the monitored predetermined type of data against the one or more parameters; wherein, if the monitored predetermined type of data matches one of the one or more parameters, then causing at least one second phase control signal associated with that parameter to be sent to the at least one component.

In some aspects, the techniques described herein relate to a method, wherein the one or more parameters include a first temperature associated with a dimming command for one of the at least one component, and a second temperature associated with a shutdown command for one of the at least one component.

In some aspects, the techniques described herein relate to a method, further including, during executing the second phase, sending control signals to the at least one component to turn on and turn off at predetermined times, wherein the at least one component is a light fixture.

In some aspects, the techniques described herein relate to a method, wherein the one of the one or more sensors may be physically separate from the at least one light fixture.

In some aspects, the techniques described herein relate to a method, wherein one of the at least one sensor may be integrated with the at least one component.

In some aspects, the techniques described herein relate to a system for providing power line communication for lighting, including: a control device which send commands, the commands converted to binary data by a protocol; an transceiver electrically connected to the control device, the transceiver including a crystal oscillator which emits a sinusoidal wave, a splitter which receives the sinusoidal wave on an input, and outputs a first signal on a first output and a second signal on a second output, each of the first signal and second signal a copy of the sinusoidal wave, a phase shift circuit connected to the second output which shifts the phase of the second signal and outputs the second signal to a phase shift circuit output, a switch having a first terminal, second terminal and a control signal output, the switch electrically connected on a first terminal to the first output and electrically connected on a second terminal to the phase shift circuit output, the switch alternating between the first terminal to the control signal output and connecting the second terminal to the control signal out according to a baseband signal in order to form a control signal, a first memory containing the protocol, a first processor electrically connected to the switch and the first memory, the first processor executing the protocol to create the baseband signal according to the commands from the controller, and an output; a power line connected to the control signal output; and at least one light fixture electrically connected to the power line, the at least one light fixture including an ultra-narrow band filter, a ballast, a second processor electrically connected to the ultra-narrow band filter, a second memory electrically connected to the second processor, the second memory containing a copy of the protocol; wherein, when a user operates the control device to send a command, the protocol, executing on the first processor, converts the command to the baseband signal and encodes the control signal with data contained in the baseband signal by alternating the output between the first signal and second signal, the control signal being output to the power line and received at the ultra-narrow band filter, decoded by the protocol, and the decoded command controlling the wattage routed to the ballast.

In some aspects, the techniques described herein relate to a system, further including one or more temperature sensors, the temperature sensors electrically connected to the power line.

In some aspects, the techniques described herein relate to a system, wherein each of the one or more temperature sensors are physically integrated with one of the at least one light fixture.

In some aspects, the techniques described herein relate to a system, wherein each of the one or more temperature sensors are physically separate from the at least one light fixture.

In some aspects, the techniques described herein relate to a system, wherein each of the one or more temperature sensors send one or more control signals to one or more of the at least one light fixture, the control signals being triggered by data being taken by the one or more temperature sensors.

In some aspects, the techniques described herein relate to a system, wherein one of the one or more control signals dims at least one of the at least one light fixture.

In some aspects, the techniques described herein relate to a system, wherein the one of the one or more control signals shuts down one of the at least one light fixtures.

In some aspects, the techniques described herein relate to a system, wherein each of the one or more temperature sensors includes a transceiver, the transceiver including a crystal oscillator circuit and an ultra-narrow band filter.

For purposes of summarizing the disclosure, certain aspects, advantages, and novel features have been described herein. It is to be understood that not necessarily all such advantages may be achieved in accordance with any particular embodiment. Thus, the disclosed embodiments may be carried out in a manner that achieves or optimizes one advantage or group of advantages as taught herein without necessarily achieving other advantages as may be taught or suggested herein.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF SOME EMBODIMENTS

Figure 1:
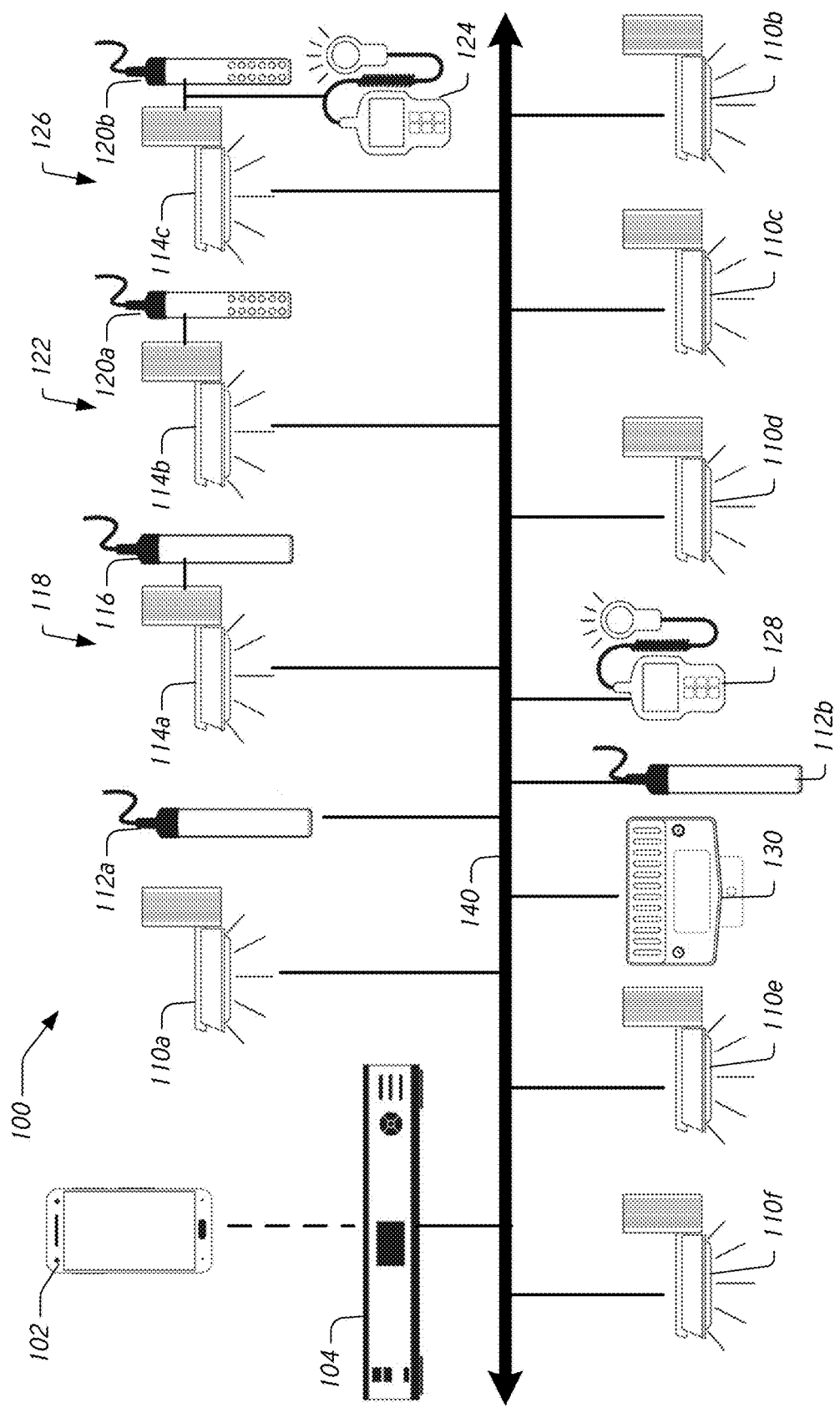
FIG. 1 shows a schematic diagram of the lighting control system.

The headings provided herein, if any, are for convenience only and do not necessarily affect the scope or meaning of the claimed invention.

Overview

Typical lighting control devices include a controller and an RJ12 cable, also know colloquially as telephone cord, that carries a control signal to the lighting fixtures from the controller. As used herein, lighting fixtures may include both lights and ballasts. Typical lighting control devices offer centralized operation of one or more sets of lighting fixtures. That is, the lighting control device may provide two or more separate sets of controls, with each set of controls configured to control a set of lights. Each set of controls is connected to a port on the controller. A lighting control device may also control external devices, such as fans, through additional ports on the controller.

Each of the sets of lights may also be referred to as a "zone." By way of example, certain controllers are capable of controlling two lighting sets or zones with as many as 256 light fixtures in each set or zone, for a total of 512 light fixtures. Typically, to connect more than one light fixture to the controller, the light fixtures are daisy chained together using cables and one or more splitters.

Each set of light fixtures may be associated with a temperature sensor. The temperature sensor is typically connected directly to the controller of the lighting control device. Providing a single dedicated temperature sensor for each zone has significant limitations. For example, 256 light fixtures may illuminate a relatively large area that is likely to include temperature variations within that area and a single dedicated temperature sensor may be unable to detect these variations. Even if the number of light fixtures were reduced to two light fixtures on opposite sides of a single room, it is possible that, should the room contain a metal door, sunlight shining directly on the metal door might make a dramatic difference in the temperature of one side of the room versus the opposite side of the room without the metal door. Thus, a single temperature sensor per zone, even if the zone has only two light fixtures, may be insufficient to properly control the light fixtures. A single temperature sensor provided for an area of any appreciable size or configuration may thus be unable to provide sufficiently precise control.

In typical lighting control devices, an extensive, burdensome, and costly cable infrastructure is required to control lights using a controller, to receive information from a temperature sensor at the controller, and to send commands from the controller to the lights based on the temperature sensor data. Moreover, the temperature sensor typically uses a dedicated cable and connects to a dedicated port on the controller. Thus, whatever length the temperature sensor cable may be, it only serves to carry the temperature sensor data to the controller.

The more extensive portion of the cable infrastructure connects the controller to the lights using RJ12 cable. RJ12 cable is a typical jack-to-unit telephone cable, which runs from a controller to a ballast on the light. Typical lights have the ballast physically connected to the hood and lamp because the cable running from the ballast to the light can generate radio frequency interference. If more than one light is to be connected to the RJ12 port on a controller, a splitter, or Y-adapter, is typically used to both send the control signal to the ballast and to continue carrying the signal to additional light fixtures. Such splitters may fail, leaving the entire system non-functional. Moreover, the introduction of a number of such splitters and additional cables means the addition of cost and failure points for the system.

For the foregoing reasons, there is a need for a lighting control system that can control a lighting system at a lower cost.

Using Power Line Communication to Control Lighting

Disclosed herein are systems and methods to control lighting fixtures using power line communication (PLC) for both centralized and decentralized control. Centralized control may also be referred to as open loop operation, and decentralized control may also be referred to as closed loop operation. In either type of operation, control signals are sent via PLC. PLC reduces or eliminates the need for dedicated cable infrastructure to send control signals to lighting fixtures. In some embodiments, both types of operation may be used simultaneously in a hybrid open loop/closed loop mode.

A lighting control system may include a control device, a plurality of light fixtures, and a plurality of temperature sensors. The lighting control system may additionally include other sensors, including quantum sensors, light sensors, presence sensors, and humidity sensors. The lighting control system may include a network of power lines to connect each of the components. As used herein, the terms "light fixture" or "light fixtures" should be understood to include ballast and hood/light combinations. The control device may be a smart phone, a tablet computer, a laptop, or any other computing device capable of wireless communication either by built in circuitry or an adapter. The control device, light fixtures, and sensors may be generically referred to as components of the system.

Each of the components may be electrically connected to a transceiver that is also connected to the power line. The transceiver may be considered to be a component of the lighting control system or it may be considered to be a separate device. In the case of the control device, the transceiver may be part of the control device or may be part of a separate device that performs other functions. For example, the device which performs other functions may be a universal device which may have wired, specifically PLC, and wireless communication capability, and may further perform device management functions. The control device may connect to the universal device via a wired or wireless connection.

Each of the transceivers may have a coupling circuit. The coupling circuit may include several sub-circuits which perform different functions. For example, the coupling circuit may transform the voltage down from the power line voltage, may further regulate voltage, and may perform some filtering of the signal. The filtering may be designed to work in conjunction with the filtering performed by the ultra-narrow band filter in the receiver portion of the transceiver.

The system may operate in two phases. The first phase may include initial power up through when long term system parameters are sent to decentralized control points. During phase two, the light fixtures on the system may be more precisely and autonomously controlled by local commands sent by sensors and potentially by the light fixtures themselves. The system may also continue to receive commands from the control device, creating a hybrid open loop/closed loop operation. Each of the control device, light fixtures and sensors may have a transceiver for communicating via PLC. To enable PLC, the system may further include at least one power line, and one or more outlets.

The disclosed system may use a building's pre-existing electrical wiring to send control signals. The use of PLC eliminates the requirement for creating a cable infrastructure to carry the sensor data and control signals. The control signals are carried on the same wiring as the electrical power signal. Unlike previous lighting systems using PLC, the PLC herein disclosed is much more robust against electrical noise that is almost guaranteed to be present on the power line, and therefore more reliable than other systems that use PLC.

Upon start up, power is applied to the transceiver which transmits control signals based on commands from the control device. The control signal is formed from a sinusoidal wave generated by a crystal oscillator in the transceiver. The crystal oscillator generates a constant sinusoidal wave in the high kHz to MHz range and with a high Q factor. The sinusoidal wave may be split to create a first signal and a second signal, which are both copies of the sinusoidal wave. The second signal may be output to a phase shift circuit. In the phase shift circuit, the second signal may be phase shifted, so that the second signal has a different phase from the first signal.

The first signal and the second signal may be combined to form the control signal by alternately outputting either the first signal or second signal using the switch. The first signal may represent a first binary state, that is either of a one or a zero, while the second signal represents the other of the binary states. The switching between the first signal and the second signal is done according to the baseband signal created by the protocol-converted commands from the control device. The resulting signal, called a control signal is output to the power line. The control signal is thus a combination of the first signal and the second signal created according to the baseband signal.

Once the control signal is output to a power line, the control signal travels the extent of that power line, and any connected power lines. That is, the control signal will continue on the power line to every terminal in a structure, or even beyond a structure, depending on the design of the power system and the PLC system. In this way, the control signal is broadcast on the power line.

On the receiving end, a light fixture or temperature sensor, or other component may be plugged in to a socket of the one or more outlets. This electrically connects the light fixture or temperature sensor to the power line and allows the light fixture or temperature sensor to receive both the power signal and any control signal present on the power line. On the light fixture or temperature sensor, an ultra-narrow band filter electrically connected to the power line filters out all of the signal on the power line except a bandwidth of 50 Hz or less centered on the transmission frequency of the crystal oscillator, which is filtered and passed. Alternatively, the ultra-narrow band filter may filter more than 50 Hz. Once the control signal is received, the control signal may be sent to a processor for baseband decoding transceiver. The decoded baseband signal may then be sent to the processor for conversion by the protocol. The protocol may be stored on a memory in the light fixture or temperature sensor. According to the protocol, a determination is made if the control signal was directed to the light fixture or sensor analyzing the decoded baseband, if not, the control signal is ignored. If the control signal is directed to the light fixture or sensor, the protocol, executing on a processor, converts the decoded baseband signal to executable instructions for controlling a light bulb or tube on the light fixture or for providing parameters to the sensor, or both when the temperature sensor is integrated with the light fixture.

In phase two, the light fixtures may be controlled essentially autonomously by sensors, which send commands based on the parameters stored in phase one, as well as continued control by the control device. Each light fixture may have a temperature sensor electronically connected to it. When a temperature sensor is physically mounted on a light fixture, the temperature sensor and the light fixture may share a transceiver. When the temperature sensors are physically separate from the light fixture or light fixtures, for example, when one temperature sensor is assigned to control two or more light fixtures, each temperature sensor includes a transceiver identical to that of the universal device. When the temperature sensor includes a transceiver, the temperature sensor may include parameters stored in a memory on the sensor which may be set by the control device, and trigger instructions for execution by the processor. For example, the instructions may be dimming the light, or at a different temperature, turning the light off. The control signal is generated by the temperature sensor in the same manner as the control device, except the commands are drawn from a predetermined list stored on the temperature sensor, and triggered by conditions detected by the sensor, rather than being triggered manually as in phase one. For example, the sensor may have a command to turn off the light if a temperature of 95 degrees Fahrenheit is detected by the sensor. Thus, rather than the commands being generated manually, the commands are generated autonomously based on predetermined conditions, in this case, the temperature sensor detecting a temperature of at least 95 degrees.

More specifically, as shown in FIG. 1, the lighting system 100 may include a control device 102. The control device 102 may be electrically connected to a transceiver, which may be a component of a universal device 104. The control device 102 may be a programmable logic controller which is connected to the transceiver via a wired connection, for example, a low voltage wired connection as is well known in the art. Alternatively, the transceiver and the control device 102 may be integrated into a single housing. Alternatively, or in addition, the control device 102 may be a smart device which is connected to the system 100 wirelessly as shown by the dotted line in FIG. 1, for example by a universal device 104 which also includes the transceiver. For example, the smart device 102 may operate using an application, or app, to communicate with the system 100. The app may be configured to run on a software package available for personal computers, for example, operating systems such as Microsoft® Windows®, Mac® OS, Unix, Linux, etc. This can allow a user to use a standard computer as an extension of the control device 102. Optionally, as is shown in FIG. 1 a user may use a mobile computing device as an extension of, or in place of, the control device 102. For example, ANDROID®, iOS®, and WINDOWS® based mobile computing devices, such as smart phones and tablets can be used as an extension of, or in place of, the control device 102. A user can install an application onto their mobile computing device. The application can allow the mobile computing device to function as an extension of, or in place of, the control device 102.

Regardless of what type of device is utilized as an extension of, or in place of, or as the control device 102, the user interface may communicate data to the universal device or a universal device 104 over a communication link. In one embodiment, the communication link can be a wireless communication link as shown in FIG. 1, for example, Wi-Fi, BLUETOOTH®, cellular (3G, 4G, 5G, LTE, etc.), or other suitable wireless communication technology. Alternatively, the communication link could be a wired connection, such as Ethernet or other open and/or dedicated communication protocols. As an alternative to a universal device 104, the system 100 may use a standard local area network (LAN) router for receiving data, and then routing it to a device. The routing device may be integrated with the control device 102, for example when a PLC controller is used as the control device 102.

A touch screen (not shown) on the control device 102 may be used as a system interface by a user (not shown). Certain commands which may be executed may be indicated by visual representations on the touch screen. For example, the commands may be indicated by icons or text, or a combination of both. When a user touches the portion of the screen with the visual representation, a command is sent in a message to the processor in the transceiver, which interprets the command using the protocol, and creates a baseband signal for encoding the control signal.

Figure 4:
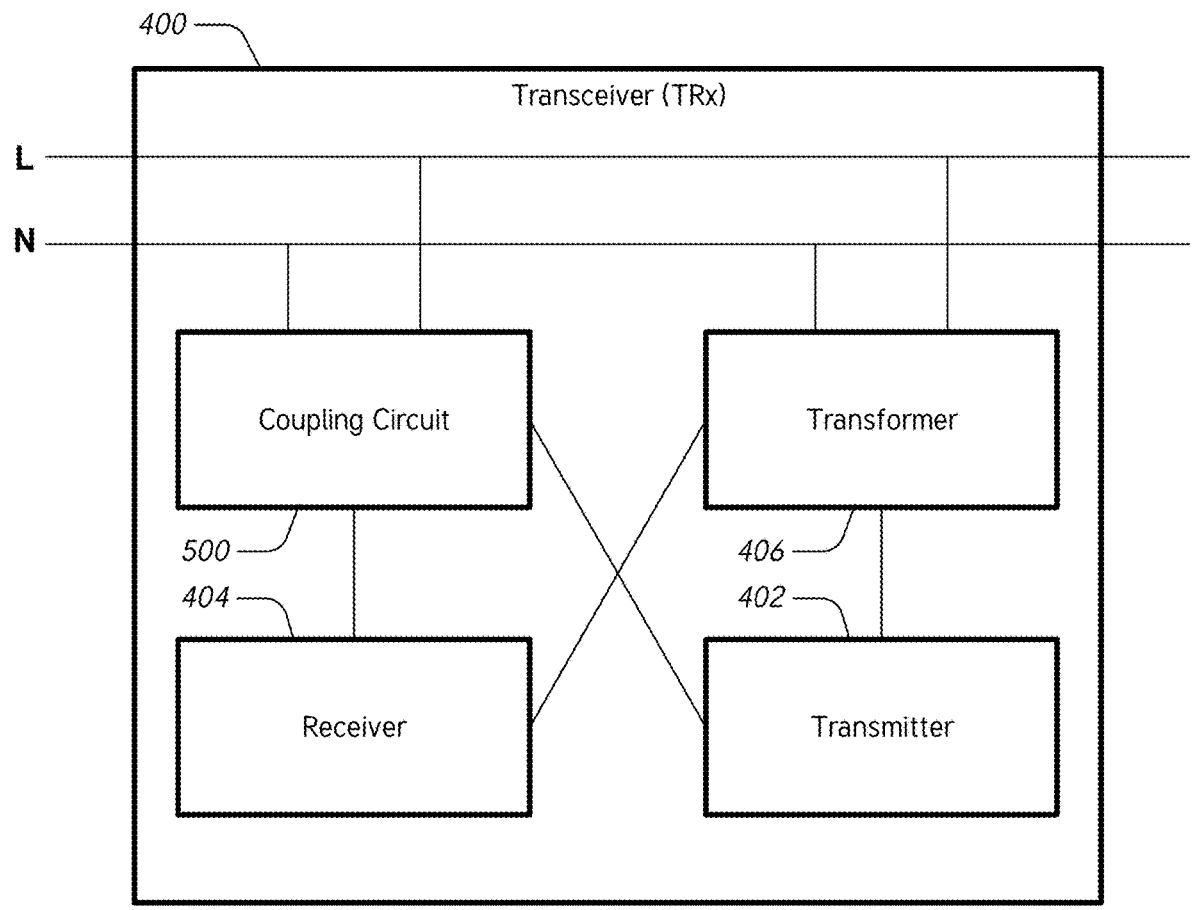
FIG. 4 shows a schematic circuit diagram of the transceiver.

As shown in FIG. 4, the transceiver 400 includes both a transmitter portion 402, and a receiver portion 404. The transmitter portion 402 includes the combination of the crystal oscillation circuit 610, the oscillation and phase shift circuit 610, and the switch 614. The receiver 404 of the transceiver 400 includes, among other sub-circuits, an ultra-narrow band filtering sub-circuit 706 and a baseband decoding sub-circuit 710. Both the transmitter portion 402 and the receiver portion 404 are electrically connected to the coupling circuit 500, discussed in detail herein. The coupling circuit 500 transforms and regulates voltage for both the transmitter portion 402 and the receiver portion 404.

The primary function of the transceiver 400 is to send signals as directed by the control device 102 or sensor, and to receive control signals, baseband decode the control signals, and to send acknowledgements of the control signals. A transmitter portion 402 of the transceiver 400 creates and sends the control signals. The receiver portion 404 of the transceiver 400 receives acknowledgements and, should any be sent, control signals from the light fixtures or sensors. For example, as shown in FIG. 1, the light fixtures 110a-f and sensors 112a, 112b, 128, 130, or combination light fixtures and sensors 118, 122, 126 may send acknowledgements of messages or self-identification information to the control device 102. Alternatively, or in addition, the light fixtures 110a-f may send the same to one or more of the sensors 112a, 112b, 128, 130, when the sensors 112a, 112b, 128, 130, are physically separate from the light fixtures 110a-f, and configured to send control signals to the light fixtures 110a-f.

The transceiver 400 on the light fixtures 110a-f may be used to send acknowledgements of commands back to the transceiver 400 interoperating with the control device 102. The control signal acknowledgements may be used to control the sending of the control signals, that is, the control signal is not resent if the acknowledgement is received. In addition, the reception of an acknowledgement may be indicated on a display of the control device 102. The receiver portion 404 on the transceiver 400 may be used to receive identification information from the light fixtures 110a-f, sensors 112a, 112b, 128, 130, and light fixture/sensor combinations 118, 122, 126 which are electrically connected to the control device 102. Further, the receiver 404 on the transceiver 400 may be used to receive the acknowledgements from the light fixtures 110a-f. When the temperature sensor 112a, 112b is a component of the system separate from any light fixture 110a-f, the temperature sensor 112a, 112b includes a transceiver. The transceiver 400 of the temperature sensor 112a, 112b is identical to that of the universal device 104, the combination light fixture/sensor combinations 118, 122, 126 and the light fixture 110a-f.

Figure 6A:
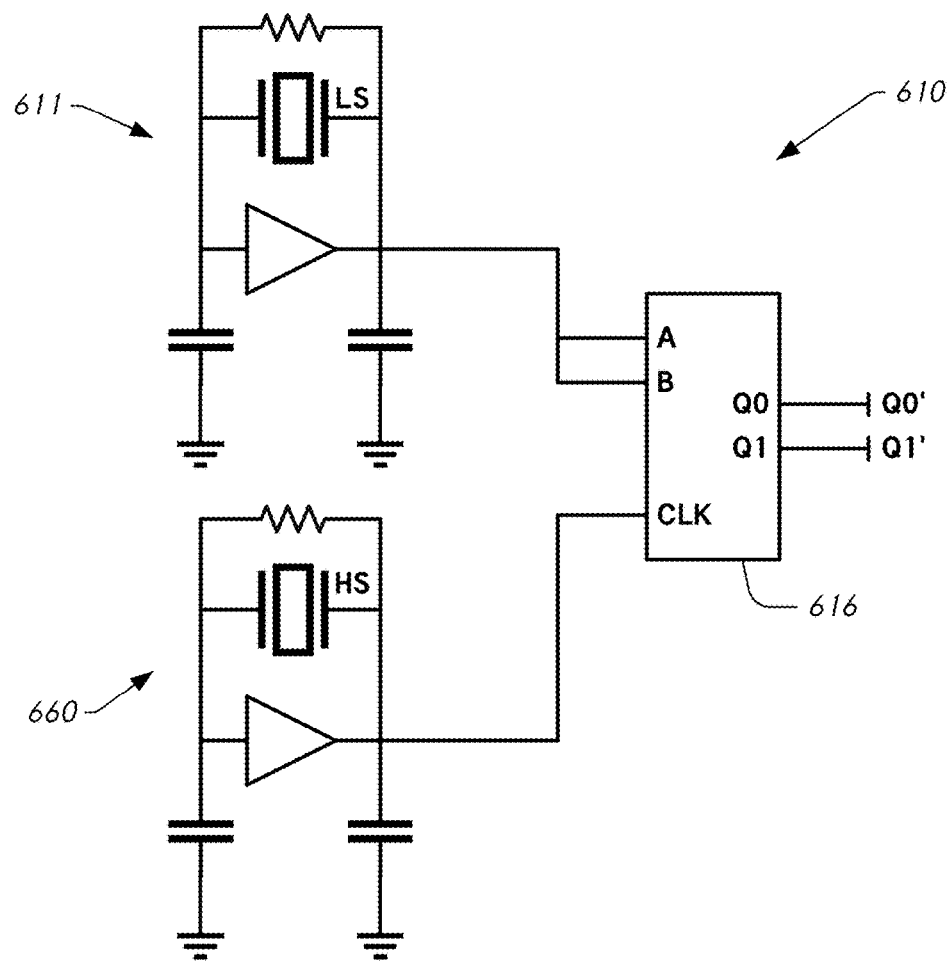
FIG. 6A shows a circuit diagram of one embodiment of the crystal oscillator and integrated circuit portions of the transceiver.

As shown in FIGS. 4 and 6A, the transmitter portion 402 of the transceiver 400 may include a crystal oscillator circuit 610. The crystal oscillator circuit 610 draws power from the power line 140. The power is taken from the power line 140 and may be transformed down by a transformer 406 to a lower voltage. The power may also be converted from alternating current to direct current. The voltage may be transformed down, for example, from 110V to 5 V. On a 0.2 A circuit of the power line 140, the 5 V of transformed voltage produces one watt of power for the crystal oscillator circuit 610. As shown in FIG. 6A, each of two crystal oscillators (signal 611, and clock 660) may output a signal. The first crystal oscillator may have a first predetermined primary frequency and amplitude. The second crystal oscillator may have a second predetermined primary frequency and amplitude, with the second primary frequency being a multiple of the first primary frequency. In the embodiment of FIG. 6A, one crystal oscillator 611 produces a signal which is split to form the two sinusoidal waves for forming the control signal. The second crystal oscillator 660 provides a clock signal. The clock signal may be used to control the amount of phase shifting. For example, if a crystal oscillator 611 of 1 MHz is used to produce the signals for transmission, the crystal oscillator 660 for the clock signal may be a multiple of 4 MHz. For example, the crystal oscillator 660 producing the clock's signal may be 16 MHz. Based on the ratio, the transceiver 400 may produce as many as 15 phase shifted signals in a single cycle of the 1 MHz signal, using the 16 MHz clock signal, as is described in further detail herein. One or more of the phase-shifted signals, along with the original signal, may be used to encode information, as is described in further detail herein. As long as the crystal oscillators receive power, the crystal oscillators will continue to output a signal.

Crystal oscillators emit a sinusoidal wave at a frequency determined by their physical structure. Importantly, crystal oscillators, and particularly quartz crystal oscillators, have a very high Q factor. Quartz crystal oscillators are capable of primary frequencies from in the high kHz up to the MHz range. However, higher frequency signals, up to the GHz range, may be produced by amplifying a harmonic of the primary frequency. Further, this disclosure also contemplates using amplified harmonics of the oscillator, and even potentially frequency modulated amplified harmonics, to allow transmission frequencies as low as 1 Hz. Also, as indicated by the high Q factor, they have a narrow bandwidth relative to their frequency. A typical Q factor for a quartz oscillator ranges from 104 to 106, compared to 102 for an inductor and capacitor, or LC, oscillator. The maximum Q for a high stability quartz crystal oscillator can be estimated as $Q=1.6 \times 107/f$, where f is the resonant frequency in megahertz.

Another important aspect of quartz crystal oscillators is that quartz crystal oscillators exhibit very low phase noise. In many oscillators, any spectral energy at the resonant frequency is amplified by the oscillator, resulting in a collection of tones at different phases. In a crystal oscillator, the crystal mostly vibrates on one axis, therefore only one phase is dominant. Low phase noise makes crystal oscillators particularly useful in applications requiring stable signals and very precise time references. This is advantageous here because the signal from one of the crystal oscillators may be phase shifted by a precise amount. In some embodiments, for desirable operation of the system, the phase shift between the two signals can be consistent, as is discussed herein in greater detail.

A crystal provides both series and parallel resonance in oscillation. The series resonance is a few kilohertz lower than the parallel resonance. Crystals below 30 MHz are generally operated between series and parallel resonance, which means that the crystal appears as an inductive reactance in operation, this inductance forming a parallel resonant circuit with externally connected parallel capacitance. Any small additional capacitance in parallel with the crystal pulls the frequency lower. Moreover, the effective inductive reactance of the crystal can be reduced by adding a capacitor in series with the crystal. This latter technique can provide a useful method of trimming the oscillatory frequency within a narrow range; in this case inserting a capacitor in series with the crystal raises the frequency of oscillation. For a crystal to operate at its specified frequency, the electronic circuit has to match what is specified by the crystal manufacturer. Note that these points imply a subtlety concerning crystal oscillators in this frequency range: the crystal does not usually oscillate at precisely either of its resonant frequencies.

Crystals above 30 MHz (and even up to >200 MHz) are generally operated at series resonance where the impedance appears at its minimum and equal to the series resistance. For these crystals the series resistance is specified (<100Ω) instead of the parallel capacitance. To reach higher frequencies, a crystal can be made to vibrate at one of its overtone modes, which occur near multiples of the fundamental resonant frequency. Only odd numbered overtones are used. Such a crystal is referred to as a 3rd, 5th, or even 7th overtone crystal. To accomplish this, the oscillator circuit usually includes additional LC circuits to select the desired overtone.

Figure 6B:
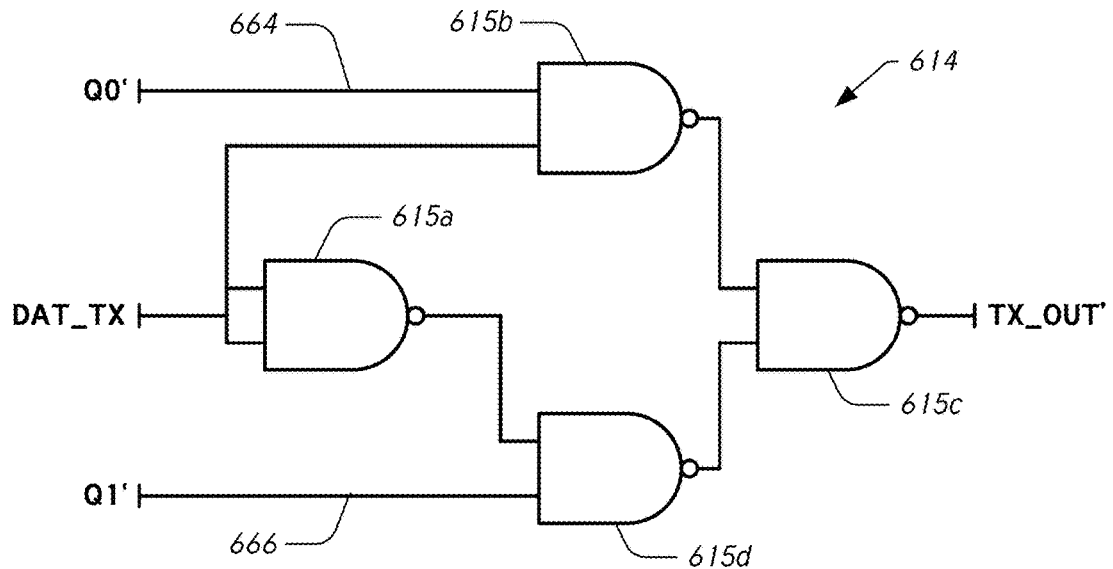
FIG. 6B shows a circuit diagram of one embodiment of the switch.
Figure 6C:
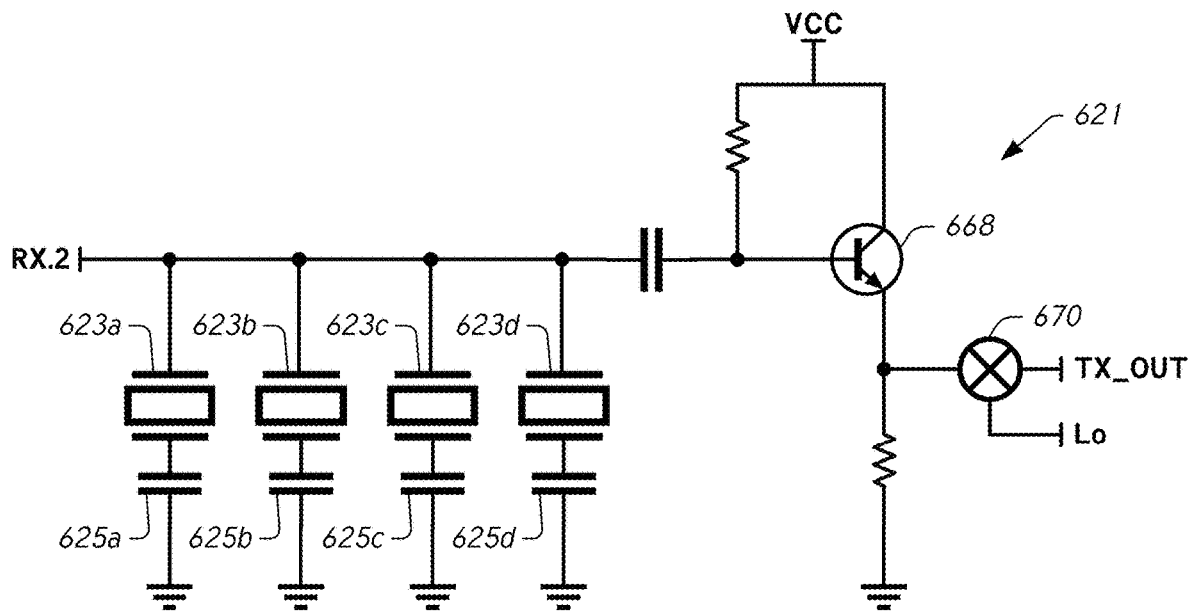
FIG. 6C shows a circuit diagram of one embodiment of a sub-circuit which strips harmonics from the signal output by the switch.

As shown in the embodiment of FIGS. 6A-6C, the signal from the transmission signal oscillator 611 is split to create two identical copies of the crystal oscillator signal. These may be called a first signal and a second signal. Both may be input to an integrated circuit 616. The second signal may be routed to a phase shift circuit within the integrated circuit 616. The phase shifting process is discussed in greater detail in PCT publication WO 2021/107961, published Jun. 3, 2021, entitled "System and Method for Power Line Communication," the entirety of which is incorporated herein by reference.

As shown in FIG. 6B, the first signal and second signal are next routed to a switch 614. The switch 614 may be a combination of logic gates 615a-615d. There may be at least as many logic gates as there are phase states. Alternatively, the switch may be a fast-switching operation, as is well known in the art, or any other switch which is able to provide fast enough switching, including transistors which may act as switches by having a voltage applied to, and then disconnected from, the base of the transistor. The switch 614 may be a single pole, dual throw, or SPDT switch. The number of poles corresponds to the number of phase states being used to encode data on the control signal. Described herein is an embodiment with two phase states for ease of understanding, but there could be more than two phase states. Input on one terminal 664 of the switch 614 is the first, unchanged signal from the crystal oscillator. Input to a second terminal 666 is the phase shifted second signal. The switch 614 may alternate between outputting the first signal and the second signal. The speed of the switch 614 allows for very rapid alternation between the first signal and the second signal. By way of example and not limitation, the switch 614 may cycle fast enough to switch 10 times from the first signal to the second signal in a single cycle of a 100 kHz signal. Thus, there is an opportunity, depending on the protocol used by the system, to send 10 bits of information in a single 100 kHz cycle, all without interference by noise. In general, as the frequency increases, the fewer phase states are imparted to the signal. Thus, long wavelengths or lower frequencies may include three or more phase states in a single cycle, while higher frequencies and shorter wavelengths may have as few as two phase states. That is, higher frequencies and shorter wave lengths may only have the original signal and one additional phase state signal. The operation of the system, including the creation and modification of the sinusoidal wave produced by crystal oscillator is discussed in greater detail herein. The transmission portion 402 is electrically connected to the coupling circuit 500, which is in turn connected to the power line 140.

Figure 5:
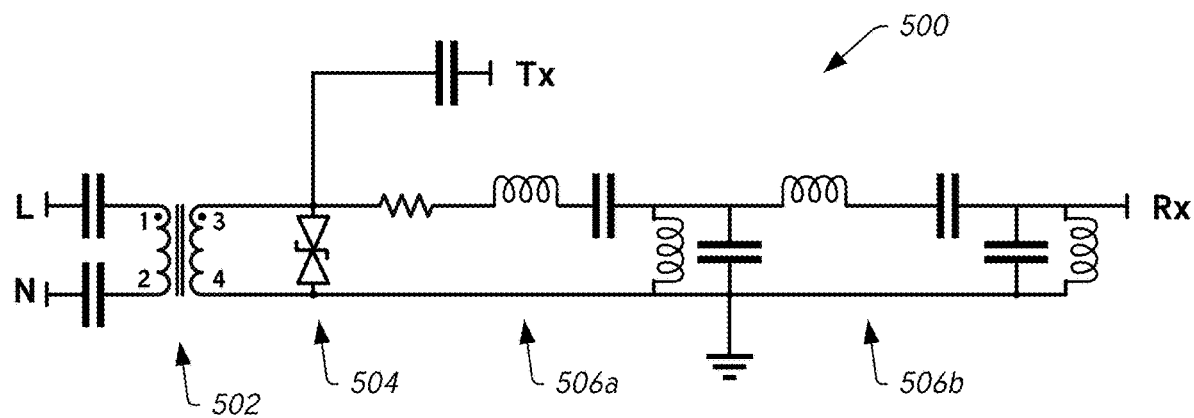
FIG. 5 shows a circuit diagram of a coupling circuit.

As is shown in FIGS. 4 and 5, the transceiver 400 may be connected to the power line 140 by a coupling circuit 500. The coupling circuit 500 may include a transformer 502 for transforming the control signal to the proper voltage for transmission. For example, the voltage may be transformed down from, as just two possible examples, from 110V to 5V, or from 110V to 13.5 V. The coupling circuit 500 may also include a voltage regulator 504. The voltage regulator 504 serves to protect the more sensitive components in the transmitter 402 and the receiver 404 portions downstream in the transceiver 400.

The coupling circuit 500, in addition to providing the proper voltages for transmitting and receiving signals, may also perform filtering functions. The process of transforming the voltage down filters much of the low frequency signal present in the power line 140. The coupling circuit 500 may include further filtering which takes place before the receiver portion 404 of the transceiver 400. After voltage regulation, the signal may pass through one or more coupling circuit filtering stages 506a, 506b. The filtering stages 506a, 506b may include a circuit with one or more resisters and one or more capacitors, commonly known as an RC circuit. These RC circuits 506a, 506b may form an RC network which filters out certain frequencies within a bandwidth. Thus, while the transformer 502 acts as a high pass filter, the RC network, which is the combination of the RC circuits 506a, 506b acts as a band pass filter. The band pass filtering of the RC network 506a, 506b augments the filtering of the ultra-narrow band filter in the receiver portion 404 of the transceiver 400. The ultra-narrow band filter is also a band pass filter. Thus, the Q factor of the combined coupling circuit and ultra-narrow band filter in the receiver portion may be an order of magnitude higher than the Q factor would be for the ultra-narrow band filter alone. By raising the Q factor, the system is able to provide better reception of control signals due to band passing a frequency band so narrow it includes the one or more frequencies of the control signal and little to nothing else. The noise present on frequencies not band passed is greatly suppressed.

Further, the RC network 506a, 506b may be changed if further filtering is required. Thus, the ultra-narrow band filter may not need to have such a high Q factor in embodiments where the coupling circuit 500 has augmented filtering. Alternatively, the RC network 506a, 506b can be changed depending on the transmission frequency. For example, in embodiments where a lower frequency and more phase states are chosen for the control signal, the RC network may be different than the RC network of an embodiment with a higher transmission frequency and fewer phase states are used to form the control signal.

Figure 2:
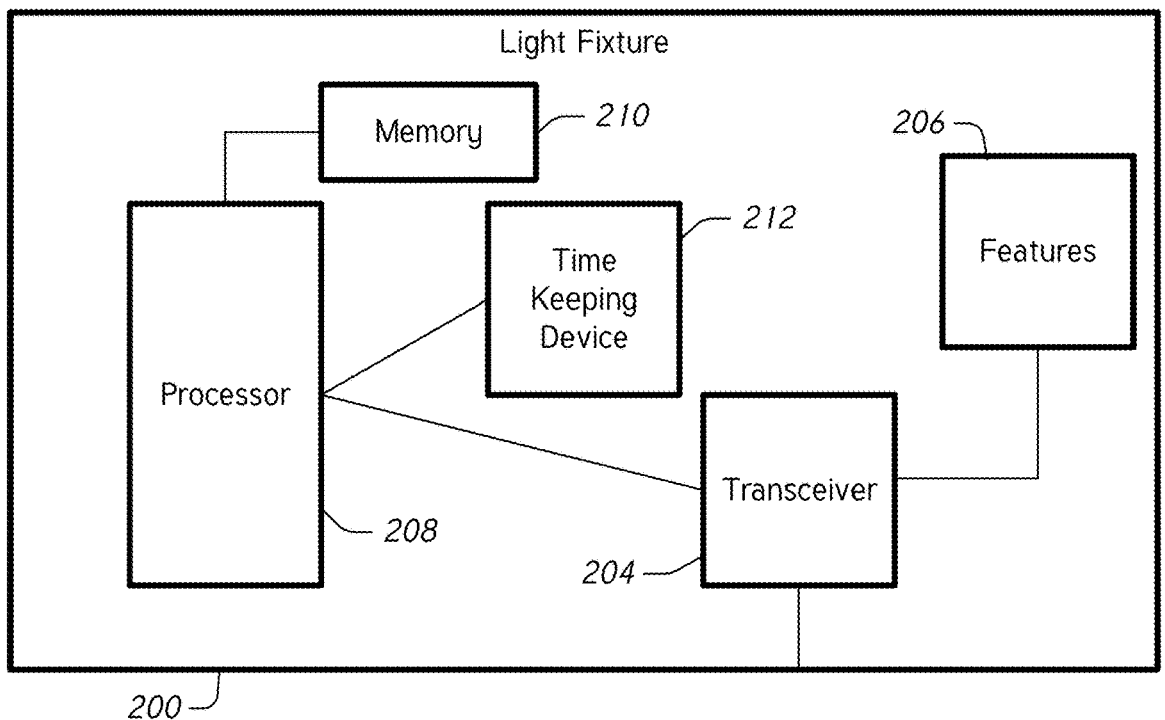
FIG. 2 shows a schematic diagram of an embodiment of a device.

As shown in FIGS. 1, 2, and 6B, on an embodiment of a light fixture 200, the transceiver 204 may be electrically connected to a memory 210 on which a protocol is stored, and a processor 208 which is electrically connected to the memory 210, and on which the protocol is executed. The protocol may include a portion which interprets commands sent by the control device 102, or from a transceiver 400 in a lighting fixture 200. The protocol, executed by the processor 208, accomplishes the encoding of the control signal by controlling the switch 614 with a baseband signal. When receiving, the transceiver 204 may decode control signals to recover the baseband signal. The processor 208, using the protocol stored on the memory 210 may then convert the baseband signal to instructions for operating the controllable features 206 of the light fixture.

As shown in FIGS. 1 and 4, the transceiver 400 which interoperates with the control device 102 may be placed in a universal device 104. The universal device 104, in addition to performing the transceiver functions, may perform other functions. For example, the universal device 104 may provide wireless communications between the control device 102 and the universal device 104. The universal device 104 may further include device management features. As part of the device management features, the universal device 104 may detect when a device is added to the system 100. For example, a light fixture 110a-f with an integrated transceiver, may be connected to the system 100. Once connected, the universal device 104 may detect the connection and send a control signal requesting identification information from the light fixture 110a-f. The light fixture 110a-f may send the identification information, and the universal device 104 may store the identification information in a memory, and the protocol may preface a control signal with the identification information to show that the control signal is intended for that particular light fixture 110a-f.

The universal device 104 is completely agnostic to the functions of a device or component added to the system 100 and the manufacturer of the device or component added to the system 100. As long as the device uses the power line control protocol, the universal device 104 can communicate with that component. Further, the universal device 104 may request that the newly connected device send the universal device 104 parameters that may be adjusted to control the device's features. For example, a light fixture 110a-f or combination light fixture/sensor 118, 122, 126 may have an on/off binary parameter. A binary parameter is where a feature has only two states, either on or off. Alternatively, or in addition, the light fixture 110a-f or combination light fixture/sensor 118, 122, 126 may have a range parameter, for example, a wattage setting. The wattage setting might relate directly to brightness and may have a range of possible values. For example, from 0 to 60 watts. The light fixture 110a-f or combination light fixture/sensor 118, 122, 126 may have other settings. For example, the light fixture 110a-f or combination light fixture/sensor 118, 122, 126 may have a setting to either turn off the light fixture 110a-f or combination light fixture/sensor 118, 122, 126 from the current brightness, or to dim from the current brightness to off. This feature is binary, either being turned on or off. A similar feature may apply to powering the light fixtures on. That is a default setting may be for the light fixture to come on at the predetermined brightness. A parameter may allow for setting the light fixtures to come on and ramp up to their brightness setting.

The protocol is designed so that messages include an identifier as to which light fixture 110a-f or combination light fixture/sensor 118, 122, 126, or sensor 112a, 112b, 128, 130 the message is directed. If a message is not directed to a particular light fixture 110a-f or combination light fixture/sensor 118, 122, 126, or sensor 112a, 112b, 128, 130, that device will ignore the message. There may be identifiers included as part of a control signal that designate all light fixture 110a-f or combination light fixture/sensor 118, 122, 126, or sensor 112a, 112b, 128, 130 on the system 100 as having a control signal directed to them. For example, there may be a control message including a command to turn all the light fixtures 110a-f or combination light fixture/sensor 118, 122, 126.

The power line 140 may be connected to one or more conventional outlets for providing power to electronic devices. Each of the one or more outlets may have one or more sockets. One or more light fixture 110a-f or combination light fixture/sensor 118, 122, 126, or sensor 112a, 112b, 128, 130 may plug in to one of the one or more sockets of each of the one or more outlets, thereby electrically connecting the light fixture 110a-f or combination light fixture/sensor 118, 122, 126, or sensor 112a, 112b, 128, 130 to the power line 140.

The power line 140 may carry standard North American domestic power. That is, 120 V nominal, 60 Hz electrical power. Alternatively, the power line may have any power signal that is standardized to a different location or may include a power signal which does not correspond to any standard. As noted previously, the power line may have electrical noise on it from one or more sources. The noise may not be placed on the power line 140 intentionally but may be the result of the operation of various devices connected to the power line 140.

The power line 140 may be carrying single phase or three phase power. If one or more of the three phase conductors are split to provide single phase operation, the disclosed system 100 will still function, because the output routes the control signal to each of the conductor wires on a three-phase system, rather than selectively choosing just one.

Light fixture 110a-f or combination light fixture/sensor 118, 122, 126, or sensor 112a, 112b, 128, 130, or all of the above may be connected to the power line 140. In FIG. 1, six light fixtures 110a-f are shown, but it will be understood that there could be fewer than six light fixtures, or more than six light fixtures. There are also combination light fixture/sensor 118, 122, 126 which include light fixtures, but also include sensors which may also further control the light fixtures, as is described in further detail herein. The light fixtures 110a-f may include a plug (not shown) for connecting the light fixture 110a-f to a conventional outlet. The outlet is electrically connected to the power line 140. The light fixtures 110a-f further include a receiver portion 404 to receive the control signal from a transmitter portion 402 of a control device 102 or sensor when a sensor is not integrated with the light fixture 110a-f, a processor for executing the protocol, a memory for storing the protocol, and a transceiver 204 for sending both self-identification information, and acknowledgement messages to another transceiver 400, and a transformer which takes power from the power line for powering the sensor, transceiver and the memory and processor which executes the protocol.

As is shown in FIGS. 1, 3, 6A and 7C, the transceiver 204 in the light fixture 110a-f or combination light fixture/sensor 118, 122, 126, or sensor 112*a*, 112*b*, 128, 130 uses an ultra-narrow band filter 706 to receive control signals sent over the power line 140. Just as with the crystal oscillator 610 in the transceiver 204, 304, 400, the ultra-narrow band filter 706 has a very high Q factor. For example, the ultra-narrow band filter 706 may also use a crystal. The crystal's stability and its high Q factor allow for an ultra-narrow band filter 706 with a crystal to have precise center frequencies and steep band-pass characteristics. Typical crystal attenuation in the band-pass is approximately 2-3 dB. Thus, the ultra-narrow band filter 706 only captures frequencies in an ultra-narrow band centered on the frequency produced by the crystal oscillator circuit 610 and allows the rest of the signal on the power line 140 to pass. Thus, the power signal on the power line 140 may be routed to other components in the light fixture to provide power, with the power signal being substantially unaffected.

With reference to FIGS. 2, 4, 5, 6A and 7C, this configuration of the crystal oscillator 610 in the transceiver 400 and preliminary filtering in the coupling circuit 500, and ultra-narrow band filter 706 in the receiver portion 404 of the light fixture 200 plays a large role in eliminating noise. In some PLC systems, noise has been a problem which completely prohibits, at least in some cases, the use of PLC. Solutions to the electrical noise problem have been proposed, but all are either burdensome, or costly, or both. For example, an external filter may be added to the system to filter out the noise, but external filtering equipment is expensive and bulky, and often required to be wired to a structure's electrical panel. Such solutions merely attempt to fix a broken design after a system is installed and identified not to work.

The disclosed system 100 does not suffer from electrical noise interfering with the control signal as do typical systems. Most power lines' noise is not generated at the frequency of the control signal. In fact, such closed systems may be designed so that the typical electrical noise output on to the power line 140, based on the devices included in the system 100, is known, and the one or more frequency for transmission of control signals may be chosen so that it lies in a part of the spectrum away from the known noise. In the case where the noise is present on the same frequency as the control signals, the noise would have to be nearly equal to, or equal to, the power of the control signal to compete in the ultra-narrow bandwidth. The ultra-narrow bandwidth is another aspect of the system 100 which provides robustness against noise. The electrical noise would have to be found within the bandwidth, which, were the bandwidth relatively wide, would be likely. With the bandwidth so narrow, it is relatively unlikely that electrical noise will be found within the ultra-narrow bandwidth. Moreover, with the relatively high transmission power spread across an ultra-narrow bandwidth, creates a relatively high energy density. In this way, the control signal can compete with, if not outright overmatch, most noise.

Another benefit to the disclosed lighting system 100 controlled by the disclosed PLC is the distance over which the control signals of the disclosed system 100 can be transmitted, and the immunity from interference caused by intervening structures. Because the energy of the control signal is placed into a much narrower bandwidth, the control signal does not suffer from attenuation in the way that a broader bandwidth signal with the same energy would. As a result, the signal is able to travel over a longer distance than a similarly powered signal with a greater bandwidth. Further, this effect may be enhanced when using a lower frequency signal with a plurality of phase states. Lower frequencies also suffer less attenuation when traveling over a transmission line. Because PLC uses a wired medium for transmission, intervening structures, including walls and floors do not interfere with the PLC signal in the way they might a wireless signal.

Temperature sensor 116 may be integrated with the light fixtures 114*a* or may be separate components on the system 100. Other sensors, for example a combined temperature/humidity sensor 120*a*, or combined temperature/humidity sensor 120*b* and a quantum sensor 124, may also be integrated with the light fixture 122, 126 to form a sensor suite. Alternatively, these sensors may also be separate. Thus, a temperature sensor 120*a*, 120*b* may be integrated with the light fixture 122, 126 and the other sensors. For example, humidity sensors. A quantum sensor 124, may be separate. Still further alternatively, the sensors may be included in any combination of integrated and separate sensors. Varying numbers of sensors may be required to efficiently operate the system 100, and these sensors 120*b*, 124 may be combined to form a sensor array. When the temperature sensors 112*a*, 112*b* are separate components, the temperature sensors 112*a*, 112*b* may be assigned to provide temperature monitoring and light control to specific light fixtures 110*a-f*, and may also be directly connected to the power line 140.

The system 100 may include quantum sensors 124, 128 to more accurately measure the function and efficiency of the light fixture 114*c*. Depending on the light fixture 110*a-f*, 118, 122, 126, the light may produce a lot of heat, but fewer photons reach the objects than the light fixtures 110*a-f*, 118, 122, 126 are illuminating. When those objects are plants, that may mean that photosynthesis is not optimized. A quantum sensor 124, 128 may provide an indication of how many photons are reaching the plant or plants and the user may optimize photosynthesis. The system 100 may further include a humidity sensor 130 or a combination temperature humidity sensor 120*a*, 120*b*. The sensors with humidity data capability 120*a*, 120*b*, 130 may take data that is used by the control device 102 in conjunction with the data from the temperature sensors 112*a*, 112*b*, 116 or combination temperature humidity sensor 120*a*, 120*b* to calculate a heat index to provide a better measure of the heat than temperature alone in a location on the system.

Figure 3:
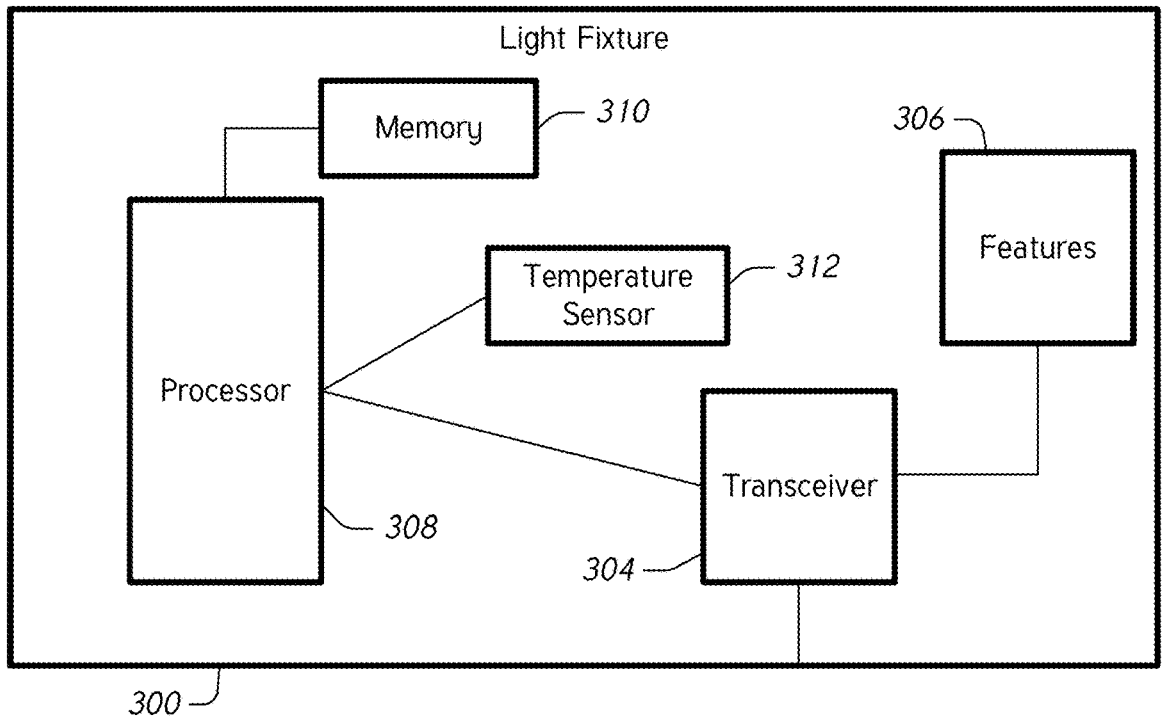
FIG. 3 shows a schematic diagram of an embodiment of an integrated device and sensor.

As shown in FIG. 3, in one embodiment, a temperature sensor 312 may be integrated with each of the light fixtures 300. When integrated, the temperature sensor 312, shares the light fixture's transceiver 304, memory 310, and processor 308. Alternatively, the light fixture and temperature sensor may share a transceiver and have separate memories and processors. Still further alternatively, the light fixture and the temperature sensor may each have a dedicated transceiver, memory, and processor. Thus, when the temperature sensors 312 are integrated with the light fixtures 300, during phase one operation, all commands may be sent directly to the light fixture 300 and stored in the shared memory 310 for processing by the protocol on the processor 308, in order to activate features 306 of the light fixture or to take action based on data taken by the temperature sensor 312, or both.

The temperature sensors 312 may be located on the light fixture 300 to best advantage of the quality of the data the temperature sensors 312 are taking. The more temperature sensors 112*a*, 112*b*, 116, 120*a*, 120*b* are in a system 100, the less likely the system 100 will be to miss temperature differences within the area of the system 100. Depending on the configuration of the light fixture 110*a-f*, 118, 122, 126, the lamp portion may produce excess heat, which may affect the reading of the temperature sensor 112*a*, 112*b*, 116, or combined temperature/humidity sensor 120*a*, 120*b*. Moving the temperature sensor 112*a*, 112*b*, 116, or combined temperature/humidity sensor 120*a*, 120*b* away from the lamp portion may allow for more accurate temperature readings. When the temperature sensor 116, or combined temperature/humidity sensor 120*a*, 120*b* is integrated with the ballast portion of the light fixture 118, 122, 126, the temperature shares the transceiver with the light fixture 118, 122, 126, just as when the temperature sensor 116, 120*a*, 120*b* may be connected to the lamp portion of the light fixture 118, 122, 126. Depending on the configuration of the ballast, it may be more advantageous to place the temperature sensor 116, 120*a*, 120*b* on or near the lamp portion of the light fixture 118, 122, 126.

At least one temperature sensor 112*a*, 112*b* may be a component separate from any light fixture 110*a-f*. The temperature sensor 112*a*, 112*b* may be connected to the power line 140. The temperature sensor 112*a*, 112*b* may include a memory. The memory may store parameters sent by the control device 102 for a corresponding set of commands already saved to a memory of the temperature sensor 112*a*, 112*b*. The temperature sensor 112*a*, 112*b* unit may include a power supply which includes a plug to connect to a standard outlet socket to send and receive control signals. The plug also allows the temperature sensor 112*a*, 112*b* to receive a power signal. The power supply may include transformers to decrease the incoming voltage to properly power the PLC components of the temperature sensor 112*a*, 112*b*.

When the temperature sensor 112*a*, 112*b* is a separate component on the system 100, each temperature sensor 112*a*, 112*b* may include a transceiver. The transceiver may include instructions stored in a memory on the temperature sensor 112*a*, 112*b* which may have certain parameters of commands set by the control device 102. For example, the control device 102 may set a particular temperature as a parameter. Based on the temperature, there may be a command to dim the assigned light fixture, or at a different temperature, to turn the assigned light fixture off. The control signal is generated by the temperature sensor 112*a*, 112*b* in the same manner as the control device 102, except the commands are drawn from a predetermined list stored on the memory of the temperature sensor 112*a*, 112*b*, and triggered by conditions detected by the temperature sensor 112*a*, 112*b*. For example, the temperature sensor 112*a*, 112*b* may have a command to turn off the light if a temperature of 95 degrees Fahrenheit is detected by the temperature sensor 112*a*, 112*b*. Thus, rather than the commands being determined manually, the commands are determined autonomously or automatically based on certain criteria or predetermined conditions.

It may also be the case that the disclosed system 100 uses a combination of the above temperature sensor configurations. That is, some light fixtures 118, 122, 126 may have a temperature sensor 116, 120*a*, 120*b* integrated, and other light fixtures 110*a-f* may be controlled by a separate temperature sensor 112*a*, 112*b* which is connected to the power line 140.

The system 100 may also include a humidity sensor 130. There may be fewer humidity sensors 130 in the system than temperature sensors 112*a*, 112*b* because there is less likely to be humidity variation within an indoor environment. Sources of water within a structure may affect this, depending on their use, and additional humidity sensors 130 may be placed in that location, recognizing the effect that the source of water may have. The control device 102 may use data from the temperature sensors 112*a*, 112*b* and the humidity sensors 130 to determine one or more heat indexes to provide a more accurate measure of the heat in any local area of the wider system. Similar to the temperature parameters, the control device 102 may send commands based on the heat index to dim lights, or control fans or an HVAC system to change the humidity depending on the measurements taken by the temperature 112*a*, 112*b* and humidity 130 sensors. Similarly, the humidity sensors 130 may send commands to fans or an HVAC system based on parameters and instructions stored in a memory, similar to the temperature sensors described herein.

Regardless of whether a single type of light fixture and sensor arrangement is used, or a combination of types of light fixtures and sensor arrangements are used, all of the light fixture and sensor arrangements achieve the purpose of decentralization of sensing and control. As described herein, prior art systems all have centralized sensing and control. With as much as one temperature sensor 116, 120*a*, 120*b* for every light fixture 118, 122, 126, much more precise control can be achieved because temperature variations within an area are controlled for by the decentralized arrangement.

Thus, the temperature sensors 112*a*, 112*b*, 116, 120*a*, 120*b*, potentially in conjunction with a humidity sensor 120*a*, 120*b*, 130, may perform a protection function. That is, the temperature sensor 112*a*, 112*b*, 116, 120*a*, 120*b* may prevent plants from being damaged by dimming the light fixture 110*a-f*, 114*a-c* or turning the light fixture 110*a-f*, 114*a-c* off to reduce the temperature in and around the plants. This may also be accomplished, to an even greater degree of accuracy, using a heat index measurement. The control device 102 may take data from one or more temperature sensors 112*a*, 112*b*, 116, 120*a*, 120*b*, and one or more humidity sensors 120*a*, 120*b*, 130, and use the data to perform a calculation to determine a heat index. This heat index may be used to make a determination regarding the function of the light fixtures 110*a-f*, 114*a-c*. The heat index may be used in place of temperature to protect the plant. Alternatively, the temperature and humidity sensors may be combined into a single sensor suite 120*a*, 120*b*. The calculation of the heat index may be done by any processor. Thus, the heat index may be determined by the control device 102, one or more of the light fixtures 122, 126 themselves, or the temperature sensor 112*a*, 112*b* or humidity sensor 130 may receive the data from the other sensor and perform the calculation on board and send out any corresponding control signals. Regardless of whether temperature or heat index is used as a measure, they are largely used for protection of the plants which may be illuminated by the system 100.

Data from one or more quantum sensors 124, 128 may be used to optimize the use of the system 100. Quantum sensors 124, 128 may be used to determine the optimum placement of the light fixtures 110*a-f*, 114*a-c* and the optimum brightness for a given time period in order to maximize the growth of plants that are illuminated by the system 100. Thus, the quantum sensors 124, 128 may be used alone or in conjunction with the temperature sensors 112*a*, 112*b*, 116 and humidity sensors 130, or combined temperature/humidity sensors 120*a*, 120*b*. The quantum sensors 124, 128 take data that may be used more for optimization of the system 100 or individual components of the system 100 rather than for pure protection, as with the temperature and/or humidity sensors. Thus, the quantum sensors 124, 128 may be used to try to get the measured data within a targeted range for optimization, rather than simply on a safe side of line as with the temperature sensors 112*a*, 112*b*, 116 or humidity sensor 130, or combined temperature/humidity sensors 120*a*, 120*b*. Further, the role of the sensor may affect the optimal placement of the sensor. For example, to get a more accurate measurement, the quantum sensor 124, 128 may need to be placed close to the objects, for example, plants, which are being illuminated.

The disclosed system 100, both because of the method of control, and because of the physical assembly of the system 100, offers considerable robustness against failures. A light fixture 110a-f, 114a-c in the disclosed system 100 will continue to function under the control of both or either of the control device 102 and the assigned or integrated sensors 112a, 112b, 116, 120a, 120b, 124, 128, 130 should any other light fixture 110a-f, 114a-c in the system 100 cease functioning. Depending on the location and type of failure in a pure open loop system, the entire system may cease functioning. Further, if the temperature sensor 116 or combined temperature/humidity sensor 120a, 120b is integrated into the light fixture 118, 122, 126, even multiple failures elsewhere in the system 100 do not affect the flow of commands from the temperature sensor 116 or combined temperature/humidity sensor 120a, 120b to the light fixture 118, 122, 126. Even if the temperature sensor 112a, 112b is a separate component, typically, there is a very small distance of power line 140 between the light fixture 110a-f and the temperature sensor 112a, 112b. The copper wire on which the signals are carried in the power line 140 has very low failure rates, making a failure on the wire between a temperature sensor 112a, 112b and a light fixture 110a-f highly unlikely. Thus, additionally, even with the added wire between the control device 102 and any light fixture 110a-f, 114a-c, failures are unlikely. Because the ability to issue commands is split between the one or more sensors and control device 102, total failure of any light fixture 110a-f, 114a-c is highly unlikely, because even in the event of the failure of the control device 102 or the one or more sensors, the other of the control device 102 or one or more sensors will still operate the light fixture 110a-f, 114a-c. The sensors 112a, 112b, 116, 120a, 120b, 124, 128, 130 also have extremely low failure rates, making the most likely source of failure the control device 102, but such failures are easier to detect than any other, for reasons explained herein.

In operation, the system 100 may function in two distinct phases. The first phase may be characterized by an initial power up and the generation of initial control signals from the control device 102. The second phase may be characterized by a hybrid open loop and closed loop control of the light fixtures 110a-f, 114a-c by the system's sensors 112a, 112b, 116, 120a, 120b, 124, 128, 130 and control device 102. In the first phase, after the control device 102 is powered up, woken up from sleep mode, or connected via a wired or wireless connection to the universal device 104, the control device 102 may interrogate the light fixtures 110a-f, 114a-c and sensors 112a, 112b, 116, 120a, 120b, 124, 128, 130 electrically connected to the power line 140. This is done by the control device 102 sending a command to the light fixtures 110a-f, 114a-c and sensors 112a, 112b, 116, 120a, 120b, 124, 128, 130 to respond to the command with identification information. If a control device 102 is already connected to the system 100, the protocol may require that a light fixture 110a-f, 114a-c or sensor 112a, 112b, 116, 120a, 120b, 124, 128, 130 which is later connected to the system 100 send self-identification information to the control device 102. The identification information may be sent via a universal device 104 and may include an identifier for the device and parameters which may be set in operation of the device.

The protocol is designed such that the control device 102 and assigned sensors do not send the same commands, rather control is split between the two depending on which is best suited for issuing the command. Further, as described herein, it is possible that the light fixture 110a-f, 114a-c may control itself with time-based commands, when the light fixture includes an internal time keeping device, and the instructions and parameters are stored in memory.

Soon after power on, a user may manipulate the control device 102. The control device 102 may cause a command to be sent to an electrically connected processor. The processor may be further connected to a memory. The memory may store a protocol. The protocol includes the instructions necessary to convert the received command to a baseband signal. The processor executes the protocol. To encode the baseband signal onto a control signal, the processor uses the baseband signal to control a switch.

Because the control device 102 receives identification information for each light fixture 110a-f, 114a-c or sensor 112a, 112b, 116, 120a, 120b, 124, 128, 130 individually, or combination of light fixtures, or temperature sensors connected to the control device 102, future commands may be specified as being for a particular light fixture 110a-f, 114a-c, sensor 112a, 112b, 116, 120a, 120b, 124, 128, 130, or combination thereof. Because these commands contain information identifying the light fixture 110a-f, 114a-c or sensor 112a, 112b, 116, 120a, 120b, 124, 128, 130, or combination thereof, to which they are directed, the commands will be ignored by other light fixtures or sensors, or combinations thereof. In some embodiments, some or all of the light fixtures or sensors, or combination thereof could be specified by a command. Thus, groups of light fixtures, e.g., a group of light fixtures in a specified area of a structure, may be controlled as a group. In some embodiments, the sensors may be controlled as a group apart from the light fixtures, or vice versa. Or, if, for example, all light fixtures and sensors need to be powered down, this can also be accomplished through the above identification of all light fixtures 110a-f, 114a-c. In fact, there may be a particular identifier in the protocol specifying that a command is for all components of the system, including light fixtures 110a-f, 114a-c and sensors 112a, 112b, 116, 120a, 120b, 124, 128, 130. The availability of such an identifier prevents the protocol from requiring that each light fixture and temperature sensor have an individual identifier separately listed in a command.

Figure 8:
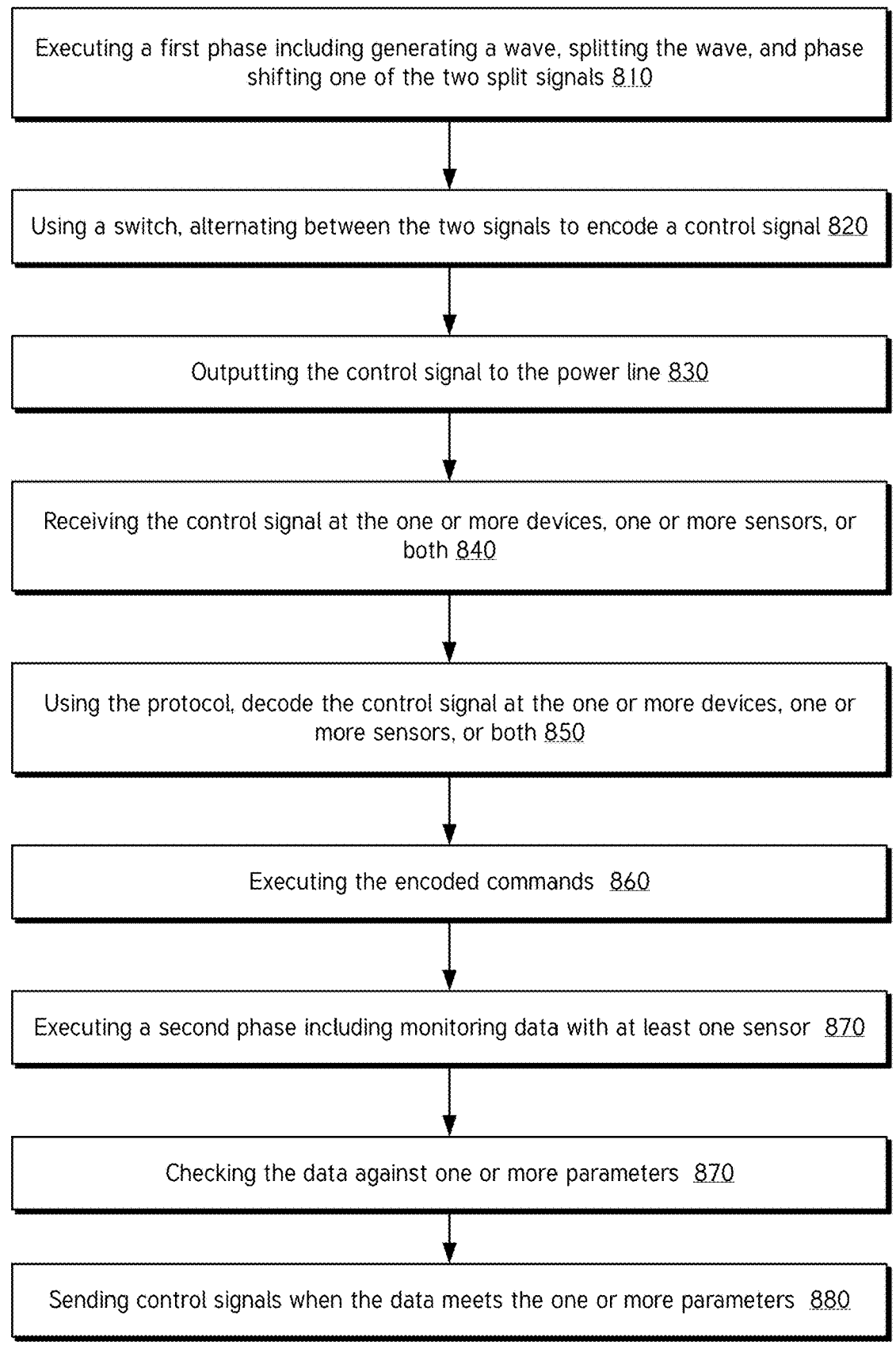
FIG. 8 shows a flowchart of a method of providing power line communication.
Figure 9:
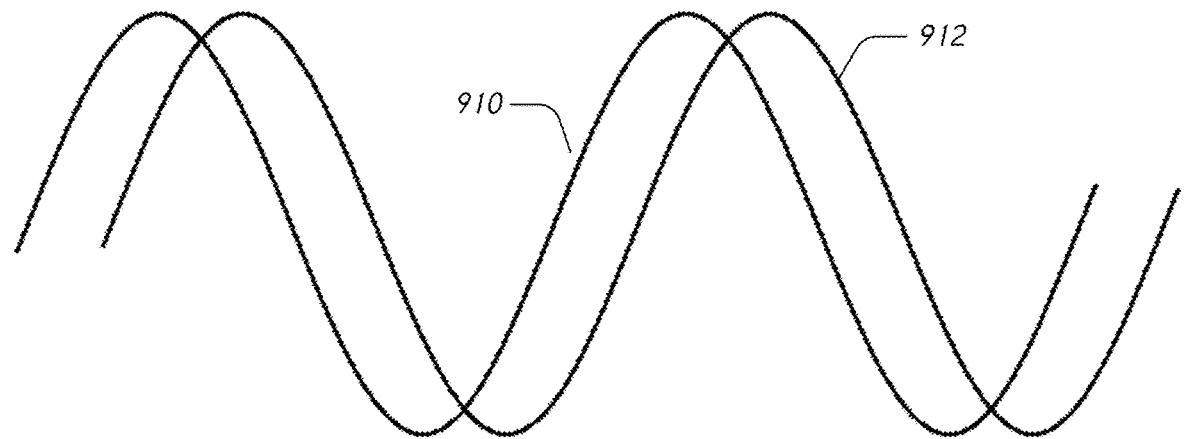
FIG. 9 shows a diagram of the two crystal oscillator waves at the switch.

To send commands to one or more light fixtures 118, 122, 126 with integrated sensors, or to separate sensors 112a, 112b, 128, 130 during phase one, commands from the control device 102 are converted to control signals by the protocol. The control signal has two parts. The first part is the sinusoidal wave, which the crystal oscillation circuit 610 generates continuously, and as shown in Step 810 of FIG. 8. The second part is a sinusoidal wave with a shifted phase, which is shown in Step 810 of FIG. 8. After generation, the sinusoidal wave is fed to the phase shift circuit to create the second signal, and to the connected switch 614, as is described herein. The output of the phase shift circuit is input to a different terminal of the switch than the unaltered first signal or sinusoidal wave. The two signals arriving at the switch are shown in FIG. 9, including the first signal 910 and the phase shifted second signal 912. In addition to being connected to the oscillator and the phase shift circuit the switch 614 is also connected to a processor which executes the protocol by providing a baseband signal to the switch. Based on the command signals from the control device, which are converted by the processor using the protocol, the processor directs the switch 614 to switch between the first signal and second signal according to the baseband signal to encode a control signal as is shown in Step 820 of FIG. 8.

Information is encoded by the presence of one or the other of the first signal and the second signal. The first signal my represent one binary state, that is, a one or a zero, and the second signal may represent the other binary state. It will be readily understood by those of ordinary skill in the art that signals of still differing phase states may be created by adding phase shift circuits which shift the phase of the sinusoidal way differing amounts. By way of example and not limitation, there could be five phase shift circuits, which generate signals with five different phase states. Including the original signal, six phase states are represented. Each phase state may be assigned to represent a binary state.

Alternatively, there may be more than two data states. That is, the protocol may define a non-binary system. For example, there may be three phase states, representing a one, zero, and negative one. Such a protocol may offer more fidelity, and the ability to communicate the same commands with fewer bits of data. Such a system may be achieved using a negative phase shift. That is, from the original signal, a second signal may be created which phase shifts in a positive direction from the original signal, and a third signal may be created which phase shifts in a negative direction from the original signal. The original signal may be assigned to represent a zero, the positive phase shifted signal a one, and the negative phase shift signal a negative one. Other protocols may be used which may have more than three data states.

Sequences of data, encoded with binary bits or otherwise, may form a control signal that can be analyzed and baseband decoded by the protocol. As an example, the light fixtures and sensors may identify themselves using a binary code of a set number of digits. The identification may be a shorter or longer sequence than those of the commands. The protocol may define a preliminary indicator which indicates the start of a command or data string, and a second indicator which indicates the command or data string is complete and requests that the lighting fixture or fixtures, or temperature sensors to which the command was directed send an acknowledgement. Similarly, the protocol may use binary sequences to define commands. By way of example and not limitation, the protocol may define that "1001" may correspond to a command to turn a lighting fixture 110a-f, 114a-c to 100% of the wattage, while "1000" may correspond to a command to turn the lighting fixture 110a-f, 114a-c off. The data and commands may be packaged as messages that include the preliminary indicator that a command or data follows, headers which identify to which fans the command is directed, the command, and an indicator that the command is complete and a request for acknowledgement of the command by the lighting fixture or temperature sensor.

It should be noted that when the control signal is encoded by the switch, the frequency of the sinusoidal wave is unaffected. Rather, within the control signal only the phase changes with time. Thus, the control signal is output to the power line with the frequency unaffected from when the sinusoidal wave was generated by the crystal oscillator.

Figure 10:
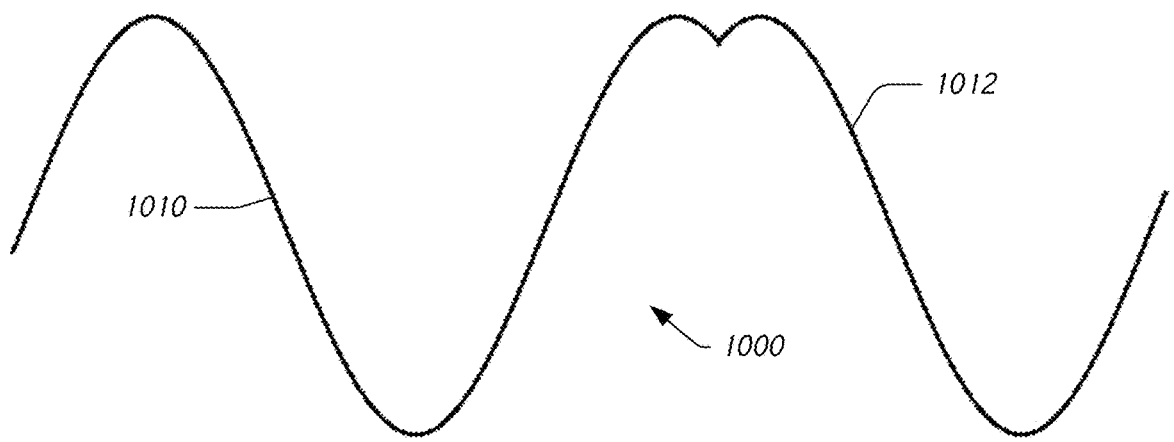
FIG. 10 shows one embodiment of a control signal at the receiver.

Once the control information is encoded by creating the control signal, the control signal is output to a filter circuit 621, which filters out sideband signals with a series of local oscillators 623a-d and capacitors 625a-d. The control signal is sent through a transistor 668 and lamp 670 before being output to the power line 140, as is shown and described in Step 830 of FIG. 8. The output is broadcast throughout the power line 140. An example control signal 1000 is shown in FIG. 10. The control signal includes changes of phase as the switch alternates between signals. This is shown in the control signal 1000 by the first signal 1010 and the phase shifted second signal 1012.

Start up control signals sent during phase one operation by the control device 102 may include power on signals for the light fixtures 110a-f, 114a-c and sensors 112a, 112b, 116, 120a, 120b, 124, 128, 130. Alternatively, the startup control signals may include parameters, for example power on and power off times for the light fixtures if the light fixtures have internal time keeping devices. Both the power on and power off control signals may be augmented by control signals which indicate ramping up the brightness of the light fixtures during power on and ramping down the brightness of the light fixtures during power off. Ramping up and ramping down may use the dimming function of the lights to gradually power them on from a lower brightness to a greater brightness, and gradually power the lights down from a greater brightness to a lower brightness, and then off. This function is of great benefit when the lighting system is used for indoor agriculture, because the ramping simulates sunrise and sunsets, allowing the lighted crops to function as if they were in an outdoor environment. All of the above control signals may come from the control device during both phase one and phase two of the operation of the system.

Commands or parameters may also be sent during phase one to the sensors 112a, 112b, 116, 120a, 120b, 124, 128, 130, without regard to whether the sensors are integrated with the lighting fixtures or are separate components on the system. For example, the controller may send temperature parameters for the temperature sensor's native dimming and shut down commands. The dimming command specifies dimming to a lower wattage when a temperature parameter or heat index is met. By way of example and not limitation, the controller may specify that the temperature sensor should send a command to dim the light to 50% of the current wattage if a temperature of 80 degrees Fahrenheit is detected. The shutdown command turns off the light fixture to which the temperature sensor is assigned if the temperature sensor detects a temperature indicated in the parameter. By way of example and not limitation, if the temperature sensor detects a temperature of 90 degrees Fahrenheit, the lighting fixture is commanded to shut down. If the temperature sensor is implemented as a separate component, the controller may send control signals to the temperature sensor that assigns light fixtures to the temperature sensor, which indicates to which light fixtures the temperature sensor is to send control signals. Each temperature sensor may be assigned one or more light fixtures to which the temperature sensor is to send commands. Because the controller is sent identification information by all the system components, a user may identify the components and make the assignment using the control device. The sequence is the same for heat index, with the added step of calculating the heat index from the temperature and humidity data.

On the receiving end, the control signal 1000 is received first on the coupling circuit and may be filtered within the coupling circuit as described herein. Next, the control signal is passed from the coupling circuit to the receiving circuit, and, specifically, the ultra-narrow band filter 706 of the receiver. The receiver may be a part of the transceiver in a light fixture or a sensor. Sensors may be integrated with the light fixtures or added as separate components on the system, as is shown in Step 840 of FIG. 8. The ultra-narrow band filter filters out only a bandwidth of about 50 Hz or less that is centered on the transmission frequency of the crystal oscillator from the signal on the power line. Naturally, the rest of the signal on the power line is unaffected by the ultra-narrow band filter so that the power on the power line may be used to power lighting fixtures, sensors, or integrated light fixtures and sensors. The 50 Hz or less bandwidth captures the control signal because the phase shifts do nothing to spread the bandwidth of the original sinusoidal wave generated by the crystal oscillator. That is to say, as discussed herein, the signal is not frequency modulated.

Following the filtering, the control signal is amplified in the amplification sub circuit 708 and baseband decoded in the baseband decoder circuit 710. A protocol stored on a memory, and executing on a processor on the light fixture, sensor, or integrated light fixture and sensor, detects and analyzes the information in the control signal 1000. The control information encoded on the control signal 100 may be decoded and converted by the protocol, as shown in Step 850 of FIG. 8. The conversion may result in instructions which are executable to give commands to the light fixtures and to set parameters for the temperature sensors, either integrated with the light fixtures or as separate components, as shown in Step 860 of FIG. 8, and described herein.

The use of ultra-narrow bandwidth and phase shifting provides further robust protection against interference by electrical noise on the power line 140. For electrical noise on the system to interfere with the control signal, the electrical noise would need to both reach into the narrow bandwidth on which the oscillator is transmitting, and the filter is receiving, and to shift its phase as the control signal 1000 does. This kind of rapid phase shifting is uncommon in electrical noise, including the noise typically found on power lines. Thus, in addition to all the other ways the system 100 eliminates electrical noise which may affect the control signal 1000, even the manner in which the information is encoded provides robustness against interference by electrical noise.

After the phase one control signals are sent and received, the system may enter phase two operation. Phase two is characterized by a combination of open and closed loop operation. As described herein, the sensors may send command signals using the same encoding as the control signals from the control device described for phase one operation. However, although manual user control is possible during phase two operation of the system, at least some control is assumed by the sensors during phase two operation. This is shown in Step 870 of FIG. 8. Based on the temperature parameters provided during phase one, the one or more temperature sensors will automatically send control signals to the assigned lighting fixtures if any of the stored temperature parameter is reached. This is shown in Step 870 and 880 of FIG. 8. Per the example given herein for the temperature parameters, if the temperature sensor detects a temperature of 80 degrees Fahrenheit, the temperature sensor will send a control signal containing a dimming command to the temperature sensor's assigned light fixtures. Alternatively, if the temperature sensor detects a temperature of 90 degrees Fahrenheit, the temperature sensor will send a control signal containing a shutdown command to the temperature sensor's assigned light fixtures. All commands which have a temperature as a parameter may be native to the temperature sensor, with the controller providing the parameter of the precise temperature at which the commands should be sent during phase one. Commands from the temperature sensor may be augmented by commands from the control device, but such commands on not required after phase one. Alternatively, a heat index may be used as described herein. Dimming or brightening of the lights may be controlled by the quantum sensors.

Contemporaneously during phase two, the control device 102 may send commands which include a time as a parameter. The control device 102 includes a clock function, which may be set to local time. The control device also includes a timing function to control when the lights are powered on and when they are powered off, to simulate daylight during a 24-hour day cycle. The timing function includes sending a control signal to the one or more light fixtures to power on at a predetermined time, and to power off at a predetermined time. The powering on may be customized by ramping the brightness of the one or more light fixtures up to simulate a sun rise, as described herein. Similarly, the powering off may be customized by ramping the brightness of the one or more light fixtures down to simulate a sun set, which is also described herein. Both the ramping time, and the starting brightness, as well as the amount of increase in wattage, and therefore resulting brightness, may be parameters which may be set by a user. These parameters may be built into the control device and may operate essentially autonomously during phase two.

Alternatively, as shown in FIG. 2, the light fixtures 200 may include a time keeping device 212, for example, a crystal oscillator, and the time-based commands may be stored in a memory 210 on the light fixture 200 and executed by the processor 208 on the light fixture. Such an arrangement would add further robustness to the system as time-based commands, which are typically executed from the control device in typical systems, are off-loaded to individual light fixtures. Thus, even if the control device should fail, or if individual light fixtures should fail, the rest of the system is configured to continue to function normally as to the time-based commands.

The parameters for either the control device or the temperature sensor may be changed at any time by a user. This may be beneficial for any number of reasons but is not required. This may be particularly beneficial in the case of a component failure. Failure detection during phase two is discussed in detail herein.

The lighting fixture 110*a-f,* 114*a-c* or sensor 112*a,* 112*b,* 116, 120*a,* 120*b,* 124, 128, 130 may, contemporaneously to any control signals from the control device 102, send an acknowledgement of the control signal back to the control device 102, or to the sensor 112*a,* 112*b,* 116, 120*a,* 120*b,* 124, 128, 130 if the system is in phase two operation. The receiver portion of the universal device or sensor receives the acknowledgement, the processor converts it using the protocol, and, accordingly, the controller 102 does not resend the command. In the event that the control device does not receive the acknowledgement, the protocol operating on the control device 102 directs the transceiver 400 connected most directly to the control device to send the command again after a pre-determined time interval. This pattern continues until the acknowledgement is received from the lighting fixture or sensor given the control signal.

Should the control device 102 fail, the control device 102 will no longer send commands. Although this is considered a system failure, as the control device 102 may send commands to every other device on the system, it is not catastrophic because it is both easy to detect if the time-based commands are sent by the control device alone. When the time-based commands are shared between the control device and the one or more light fixtures or controlled entirely after phase one by the light fixtures alone, the one or more light fixtures will continue to function under the control signals available to the one or more sensors on the system, and under the light fixtures own control for time-based commands. Thus, given that much of the operation of the system may be automated after phase one, a failure the control device in phase two may have very little impact.

The light fixtures failing to turn off is more dangerous because if the light fixtures are left on for long periods of time, heat may build and damage plants. Through decentralized control, the system has internal robustness against this risk. First, as mentioned, the time-based commands may be executed on individual fixtures. The one or more temperature sensors will continue to function. The one or more temperature sensors send the control signals to dim the light fixtures at a first predetermined temperature, and to shut off at a second, higher predetermined temperature. Thus, if the temperature is high enough to be detrimental to what the light fixtures are illuminating, even if the control device 102 has failed, and even though the time-based commands have not been shifted to the individual light fixtures for execution, the one or more temperature sensors will dim the lights as the first predetermined temperature is reached, and then will shut the lights off as the second predetermined temperature is reached. In this way, the decentralized control prevents damage to the plants. If the light fixtures don't come back on, the control device 102 failure is, again, easily detected and rectified by replacing the control device 102 and starting back up.

Example Receiver

Figure 7A:
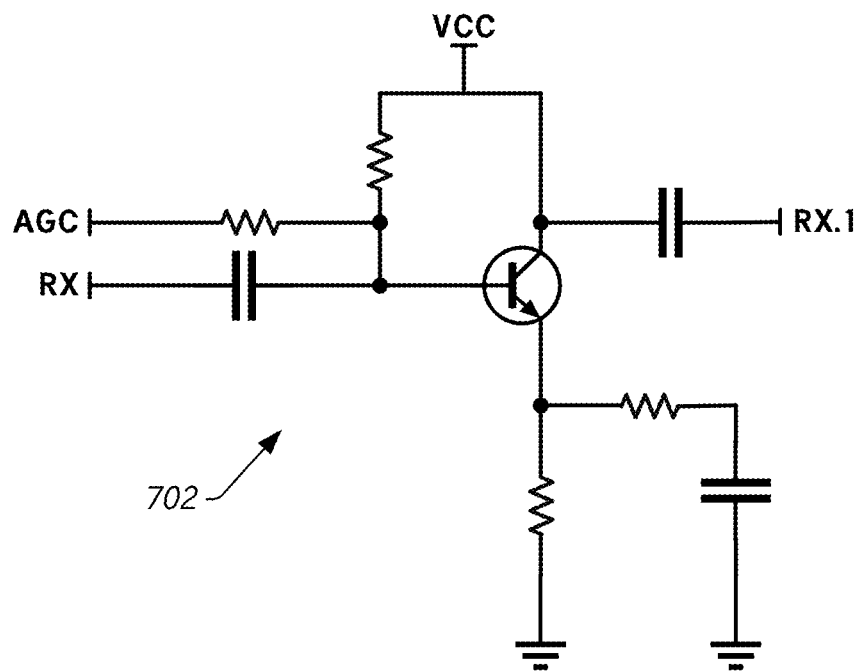
FIG. 7A shows a circuit diagram of the high frequency amplifier portion of the receiver of the transceiver.
Figure 7B:
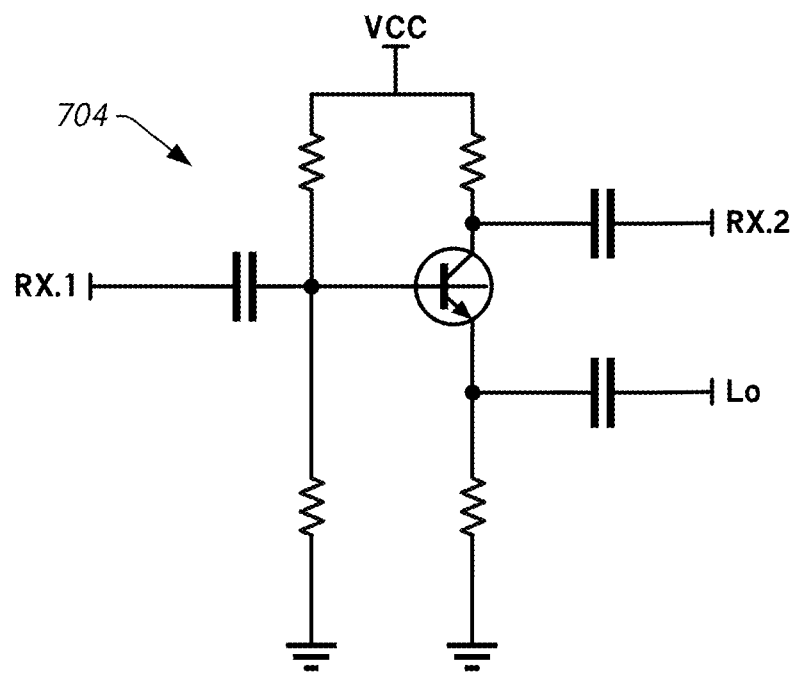
FIG. 7B shows a circuit diagram of the amplifier and mixer portion of the receiver of the transceiver.
Figure 7C:
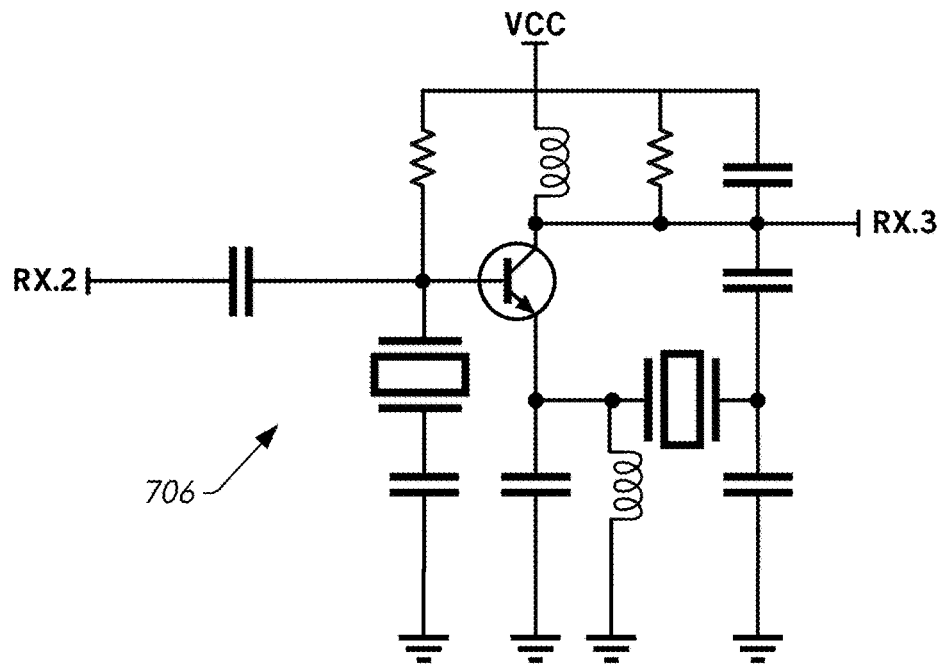
FIG. 7C shows a circuit diagram of the ultra-narrow band filter of the receiver.
Figure 7D:
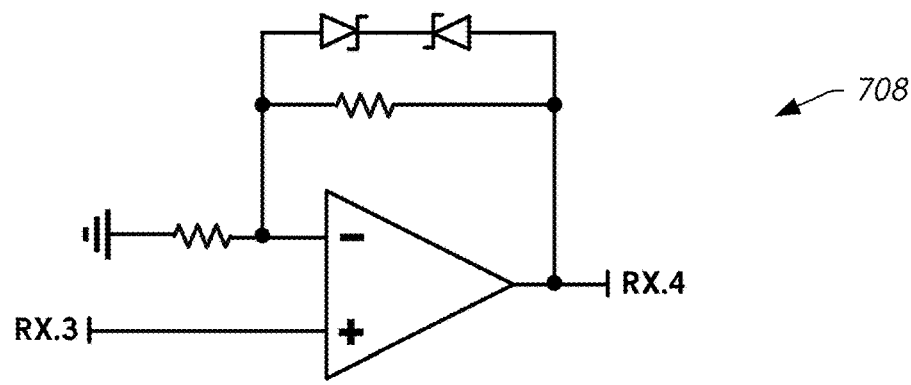
FIG. 7D shows a circuit diagram of the amplitude limiting sub-circuit of the receiver.
Figure 7E:
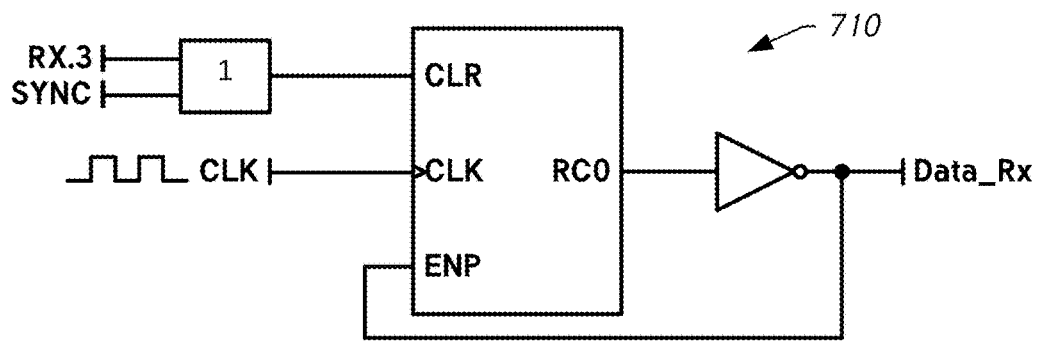
FIG. 7E shows a circuit diagram of the baseband decoding sub-circuit of the receiver.

The receiver includes a plurality of sub-circuits. As shown in FIG. 7A, a received control signal may first pass through a high frequency amplification sub-circuit 702 of the receiver. As shown in FIG. 7B, a mixing and amplification sub-circuit 704 may be connected to the high frequency amplification sub-circuit 702. As shown in FIG. 7C, connected to the mixing and amplification sub-circuit 704 is an ultra-narrow band filter 706. The ultra-narrow band filter 706 passes a very narrow band of frequencies, for example, 10 Hz. Just as with the crystal oscillator in the transceiver 104 and transceivers 126a-i, the crystal in the ultra-narrow band filter 706 has a very high Q factor. The crystal's stability and its high Q factor allow ultra-narrow band filters 706 to have precise center frequencies and steep band-pass characteristics. Thus, the ultra-narrow band filter only captures frequencies in an ultra-narrow band centered on the frequency produced by the crystal oscillator circuit 110 and does not allow the rest of the signal on the power line to pass to the transceiver. Thus, the power signal on the power line may be routed to other components in the device to provide power, with the power signal being substantially unaffected. As shown in FIG. 7D, the ultra-narrow band filter 706 is connected to an amplitude limiting sub-circuit 708. A control signal passing through the amplitude limiting sub-circuit has the amplitude controlled because too high amplitude in the control signal can cause distortion in the control signal when the control signal is decoded. As shown in FIG. 7E, the amplitude limiting sub-circuit 708 may be connected to a baseband decoding sub-circuit 710. As explained in further detail below, in the baseband decoder sub-circuit 710 may receive the analog signal with varying phase states, and the protocol may be used to measure the phase states against a clock signal as a standard or index. The baseband decoding sub-circuit 710 uses one or more integrated circuits 712, 714 to convert the control signal into a binary baseband signal. After conversion, the decoded baseband signal is amplified by an operational amplifier 716 and output.

Additional Embodiments

The processors described herein are configured to control operation of the components and the data store. The one or more processors implement and utilize the software modules, hardware components, and/or firmware elements configured to detect bursts in transmitted signals and to decode transmitted signals. The one or more processors can include any suitable computer processors, application-specific integrated circuits (ASICs), field programmable gate array (FPGAs), or other suitable microprocessors. The one or more processors can include other computing components configured to interface with the various modules, components, and data stores.

The memory or data store described herein is configured to store configuration data, analysis parameters, control commands, databases, algorithms, executable instructions (e.g., instructions for the one or more processors), and the like. The data store or memory can be any suitable data storage device or combination of devices that include, for example and without limitation, random access memory, read-only memory, solid-state disks, hard drives, flash drives, bubble memory, and the like.

It should be understood that there are many ways to implement the systems and methods described herein, including various ways of defining the commands in the protocol. Further, the various features of the embodiments disclosed herein can be used alone, or in varying combinations with each other and are not intended to be limited to the specific combination described herein. Thus, the scope of the claims is not to be limited by the illustrated embodiments.

Described herein are systems and methods to control devices, and particularly lighting fixtures, through power line communication. The disclosure herein is not intended to represent the only form in which it can be developed or utilized. The description sets forth the functions for developing and operating the system in connection with the illustrated embodiments. It is to be understood, however, that the same or equivalent functions may be accomplished by different embodiments that are also intended to be encompassed within the scope of the present disclosure.

It is further understood that the use of relational terms such as first, second, distal, proximal, and the like are used solely to distinguish one from another entity without necessarily requiring or implying any actual such relationship or order between such entities.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware.

Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system for controlling devices via power line communication, comprising:
   a control device configured to generate one or more commands for a plurality of components;
   a first transceiver electrically connected to the control device, the first transceiver configured to generate a signal with a transmission frequency, to output a first signal that is a copy of the generated signal, to output a second signal that is a phase-shifted copy of the generated signal, and to switch between sending the first signal and the second signal to create a control signal, the control signal encoding a command of the one or more commands generated by the control device;

a power line electrically connected to the first transceiver, the power line carrying an electrical power signal and the control signal; and the plurality of components electrically connected to the power line, each of the plurality of components including:
- a second transceiver;
- a filter configured to filter a bandwidth centered around the transmission frequency; and
- a processor configured to decode the control signal generated by the control device, wherein the control signal encodes a message comprising a command of the one or more commands and an identifier that identifies a component of the plurality of components, wherein a component of the plurality of components corresponding to the identifier is configured to execute the command in the message encoded by the control signal, wherein a second component of the plurality of components that does not correspond to the identifier is configured to ignore the command in the message encoded by the control signal.

2. The system of claim 1, wherein the plurality of components includes at least one lighting fixture and at least one sensor.

3. The system of claim 1, wherein the plurality of components includes a lighting fixture and a temperature sensor integrated with the lighting fixture.

4. The system of claim 1, further comprising at least one temperature sensor electrically connected to the plurality of components, the at least one temperature sensor including a third transceiver.

5. The system of claim 4, wherein the temperature sensor sends commands to at least one of the plurality of components.

6. The system of claim 4, further comprising a humidity sensor electrically connected to the plurality of components.

7. The system of claim 1, wherein each of the plurality of components is electrically connected to a quantum sensor.

8. The system of claim 1, wherein the control device is configured to convert a command for the plurality of components to a binary signal that is encoded by the first transceiver.

9. The system of claim 8, wherein the binary signal is encoded by the first transceiver by switching between the first signal and the second signal according to high and low portions of the binary signal.

10. The system of claim 1, wherein the second transceiver includes a filter configured to extract the control signal from the electrical power signal.

11. The system of claim 1, wherein the control signal dims at least one light fixture of the plurality of components.

12. The system of claim 1, wherein the control signal shuts down at least one light fixture of the plurality of components.

13. A method for providing power line communication in a lighting system, comprising:
   generating, with a control device, one or more commands for a plurality of components of the lighting system;
   generating a signal with a transmission frequency;
   outputting a first signal that is a copy of the generated signal;
   outputting a second signal that is a phase-shifted copy of the generated signal;
   switching between transmitting the first signal and the second signal to create a control signal, the control signal encoding a command of the one or more commands generated by the control device;
   providing an electrical power signal and the control signal down a power line to the plurality of components;
   filtering, at each of the plurality of components, a bandwidth centered around the transmission frequency; and
   decoding, at each of the plurality of components, the control signal generated by the control device to control operation of the plurality of components, wherein the control signal encodes a message comprising a command of the one or more commands and an identifier that identifies a component of the plurality of components, wherein a component of the plurality of components corresponding to the identifier is configured to execute the command in the message encoded by the control signal, wherein a second component of the plurality of components that does not correspond to the identifier is configured to ignore the command in the message encoded by the control signal.

14. The method of claim 13 further comprising receiving data from a temperature sensor of the plurality of components.

15. The method of claim 14 further comprising checking the received data against one or more parameters which include a first temperature associated with a dimming command for a first component of the plurality of components and a second temperature associated with a shutdown command for the first component of the plurality of components.

16. The method of claim 13 further comprising sending control signals to the plurality of components to turn on and turn off at predetermined times, wherein the at least one component is a light fixture.

* * * * *